US 9,751,565 B2

(12) United States Patent
Tatsuwaki et al.

(10) Patent No.: US 9,751,565 B2
(45) Date of Patent: Sep. 5, 2017

(54) VEHICLE FRONT BODY STRUCTURE

(71) Applicant: HONDA MOTOR CO., LTD., Tokyo (JP)

(72) Inventors: Masaaki Tatsuwaki, Wako (JP); Toshiya Takahashi, Wako (JP); Patrick Ellison, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/045,417

(22) Filed: Feb. 17, 2016

(65) Prior Publication Data

US 2016/0236718 A1 Aug. 18, 2016

(30) Foreign Application Priority Data

Feb. 18, 2015 (JP) .................. 2015-029512

(51) Int. Cl.
*B62D 21/11* (2006.01)
*B62D 21/15* (2006.01)
*B62D 25/08* (2006.01)
*B60R 19/34* (2006.01)

(52) U.S. Cl.
CPC ............ *B62D 21/155* (2013.01); *B60R 19/34* (2013.01); *B62D 21/11* (2013.01); *B62D 25/082* (2013.01)

(58) Field of Classification Search
CPC .... B62D 21/15; B62D 21/152; B62D 21/155; B62D 25/08; B62D 25/082; B62D 25/085; B62D 21/11; B60R 19/34
USPC .................. 296/187.09, 203.02, 193.09, 204
See application file for complete search history.

(56) References Cited

U.S. PATENT DOCUMENTS

| 7,517,006 B2* | 4/2009 | Kageyama | B60R 21/34 296/187.09 |
| 2003/0025359 A1* | 2/2003 | Takahashi | B62D 21/155 296/203.02 |
| 2003/0075951 A1* | 4/2003 | Hanakawa | B62D 21/152 296/187.12 |
| 2005/0189788 A1* | 9/2005 | Cornell | B62D 21/155 296/187.09 |
| 2006/0255625 A1* | 11/2006 | Kitoh | B62D 21/155 296/204 |
| 2011/0095568 A1* | 4/2011 | Terada | B62D 21/11 296/187.09 |
| 2011/0198889 A1* | 8/2011 | Takeshita | B62D 21/155 296/203.02 |
| 2011/0285176 A1* | 11/2011 | Baccouche | B62D 21/155 296/204 |
| 2011/0304174 A1* | 12/2011 | Iammarino | B62D 25/161 296/187.09 |

(Continued)

FOREIGN PATENT DOCUMENTS

JP    2000-16327 A    1/2000

*Primary Examiner* — Gregory Blankenship
(74) *Attorney, Agent, or Firm* — Westerman, Hattori, Daniels & Adrian, LLP

(57) ABSTRACT

In a vehicle front body structure, a subframe is provided below a left front side frame and a right front side frame. The left front side frame has a first fragile portion. The subframe has a second fragile portion and an extension portion. When a bumper beam's left end portion and a left bumper beam extension are crushed by an impact load, a front surface of the bumper beam's left end portion comes to substantially the same position as a front edge portion of the extension portion.

12 Claims, 16 Drawing Sheets

(56) References Cited

U.S. PATENT DOCUMENTS

| | | | | |
|---|---|---|---|---|
| 2011/0309655 A1* | 12/2011 | Mori | ............ | B62D 21/152 296/187.09 |
| 2011/0316295 A1* | 12/2011 | Yamada | ............ | B62D 21/155 293/132 |
| 2012/0074734 A1* | 3/2012 | Yoshida | ............ | B62D 21/152 296/203.02 |
| 2012/0187720 A1* | 7/2012 | Tomozawa | ............ | B62D 25/082 296/187.09 |
| 2013/0181481 A1* | 7/2013 | Baccouche | ............ | B62D 21/155 296/187.08 |
| 2013/0320709 A1* | 12/2013 | Kuwabara | ............ | B62D 25/082 296/187.09 |
| 2014/0203543 A1* | 7/2014 | Onishi | ............ | B62D 21/155 280/784 |
| 2014/0252739 A1* | 9/2014 | Otani | ............ | B62D 21/155 280/124.109 |
| 2014/0333091 A1* | 11/2014 | Stockard | ............ | B62D 21/155 296/187.03 |
| 2014/0360798 A1* | 12/2014 | Ghislieri | ............ | B62D 21/152 180/232 |
| 2015/0025163 A1* | 1/2015 | Park | ............ | C08J 9/0061 521/95 |
| 2015/0061272 A1* | 3/2015 | Watanabe | ............ | B62D 21/11 280/784 |
| 2015/0197284 A1* | 7/2015 | Miyagano | ............ | B62D 21/155 296/187.09 |
| 2015/0221115 A1* | 8/2015 | Matsubara | ............ | G06T 11/60 345/633 |
| 2015/0298741 A1* | 10/2015 | Winberg | ............ | B62D 21/11 296/187.09 |
| 2015/0314807 A1* | 11/2015 | Nusier | ............ | B62D 21/11 296/187.09 |
| 2015/0336613 A1* | 11/2015 | Friedrich | ............ | B62D 21/152 701/45 |
| 2015/0360632 A1* | 12/2015 | Nishida | ............ | B62D 21/152 293/133 |
| 2016/0083013 A1* | 3/2016 | Fujihara | ............ | B62D 21/152 296/187.09 |
| 2016/0107695 A1* | 4/2016 | Lee | ............ | B62D 25/082 296/187.09 |
| 2016/0207573 A1* | 7/2016 | Kitakata | ............ | B62D 21/152 |
| 2016/0236718 A1* | 8/2016 | Tatsuwaki | ............ | B62D 21/155 |
| 2016/0332670 A1* | 11/2016 | Nusier | ............ | B62D 24/00 |
| 2016/0375938 A1* | 12/2016 | Matsuo | ............ | B62D 21/11 296/204 |

* cited by examiner

VEHICLE FRONT BODY STRUCTURE

CROSS REFERENCES TO RELATED APPLICATIONS

The present application claims priority under 35 U.S.C. §119 to Japanese Patent Application No. 2015-029512, filed Feb. 18, 2015, entitled "Vehicle Front Body Structure." The contents of this application are incorporated herein by reference in their entirety.

TECHNICAL FIELD

The present disclosure relates to a vehicle front body structure in which front side frames extend in a vehicle body front-rear direction and in which a subframe is provided below the front side frames.

BACKGROUND

In some vehicle front body structures, a front portion of each front side frame is protruded forward, the protruded front portion is formed as a fragile portion, and a subframe is provided at a location that is below and rearward of the fragile portion substantially in the vehicle body front-rear direction (i.e., below the front side frames).

According to such a vehicle front body structure, when, at the time of a frontal collision, impact load is input from the front to the structure, the input impact load compresses and deforms a fragile portion during an early period of the frontal collision. After the fragile portion is compressed and deformed, the subframe is bent during a terminal period of the frontal collision so that the front side frames undergo bending deformation, absorbing impact energy (see, for example, Japanese Unexamined Patent Application Publication No. 2000-16327).

In the vehicle front body structure of the foregoing unexamined patent application publication, front portions of the front side frames are protruded forward and formed as fragile portions. Therefore, it is conceivable that the front side frames in this structure are elongated in the vehicle body front-rear direction, leading to an increased length of the entire vehicle body.

Furthermore, of each front side frame in this structure, a region that undergoes bending deformation during the terminal period of a frontal collision has a substantially consistent cross section. Therefore, the sites at which the individual front side frames actually bend vary in location, so that it is not easy for the structure to achieve stable absorption of impact energy of a frontal collision.

The present application describes a vehicle front body structure capable of allowing minimization of the length of an entire vehicle body and stably absorbing impact energy.

SUMMARY

According to one aspect of the disclosure, that is, a first embodiment of the disclosure, a vehicle front body structure includes a front side frame extending in a vehicle body front-rear direction, a bumper beam extension provided at a front end portion of the front side frame, a bumper beam provided at the bumper beam extension and extending in a vehicle width direction, and a subframe provided below the front side frame. The front side frame has a first fragile portion that is formed in an intermediate portion of the front side frame in the vehicle body front-rear direction. The subframe has a second fragile portion that is formed in an intermediate portion of the subframe in the vehicle body front-rear direction and an extension portion that extends further forward substantially in the vehicle body front-rear direction than the front end portion of the front side frame. A front edge portion of the extension portion is disposed so as to substantially coincide with a front surface of the bumper beam in the vehicle body front-rear direction when the bumper beam and the bumper beam extension are crushed by an impact load.

According to a second embodiment of the disclosure, the vehicle front body structure may further include a subframe support portion that connects a front end portion of the subframe to the front end portion of the front side frame from below and that has a supporting oblique surface that extends toward the first fragile portion.

In a third embodiment of the vehicle front body structure of the disclosure, the first fragile portion may have a depression portion that is hollowed inward in a vehicle width direction so as to avoid interference with a road wheel provided at an outward side of the front side frame in the vehicle width direction when the road wheel is turned inward in the vehicle width direction.

In a fourth embodiment of the vehicle front body structure, the subframe support portion may include a bulkhead that is provided inside the subframe support portion and below the supporting oblique surface and a collar nut which is provided inside the subframe support portion and whose seat portion is joined to a bottom surface of the subframe support portion and whose upper portion is joined to the bulkhead, and a fastening member that extends through the subframe from below may be coupled to the collar nut.

In a fifth embodiment of the vehicle front body structure, the second fragile portion may be provided in a bent portion of the subframe which has been bent downward and the second fragile portion may have a depression portion that is hollowed from an outward side of the second fragile portion toward an inward side of the second fragile portion in the vehicle width direction.

In a sixth embodiment of the vehicle front body structure, the subframe may be fastened so that a rear end portion of the subframe is separable from a vehicle body frame when the subframe is bent by the impact load.

In a seventh embodiment, the vehicle front body structure may further include a front pillar that stands at an outward side of the front side frame in the vehicle width direction, an upper member that extends forward from a portion of the front pillar which is above the front side frame, a lower member that extends from a front end portion of the upper member to a location at an outward side of the front side frame in the vehicle width direction, and a reinforcement portion disposed between a front end portion of the lower member and the front end portion of the front side frame and connecting the front end portion of the lower member and the front end portion of the front side frame. Furthermore, the reinforcement portion may have in a plan view a triangular shape that is partially defined by a reinforcement oblique surface that extends obliquely from a side of the front end portion of the lower member toward the first fragile portion.

In an eighth embodiment of the vehicle front body structure, the bumper beam may be connected, via the bumper beam extension, to a front portion of the front side frame, a front portion of the reinforcement portion, and a front portion of the lower member.

In the vehicle front body structure according to the foregoing first embodiment of the disclosure, the first fragile portion is formed in the intermediate portion of the front side frame and the second fragile portion is formed in the intermediate portion of the subframe. Furthermore, the subframe is provided with the extension portion. The extension portion extends to a location that is further forward substantially in the vehicle body front-rear direction than the front end portion of the front side frame.

Furthermore, in this vehicle front body structure, the front edge portion of the extension portion is disposed so as to be at the same position as the front surface of the bumper beam when the bumper beam is crushed by impact load.

More specifically, when a frontal collision occurs and impact load is input from the front of the vehicle body, the impact load crushes the bumper beam and the bumper beam extension during an early period of the frontal collision. In this state, the impact load is transmitted from the bumper beam extension to the front side frame and also from the front edge portion of the extension portion to the subframe.

Note that the front side frame is provided with the first fragile portion and the subframe is provided with the second fragile portion. Therefore, during an intermediate period of the frontal collision, the load transmitted to the front side frame bends the first fragile portion and, simultaneously, the load transmitted to the subframe bends the second fragile portion. Thus, impact energy can be stably absorbed.

Furthermore, in this structure, the bumper beam extension is provided at the front end portion of the front side frame and the bumper beam is provided at the bumper beam extension. That is, protrusion of the fragile portion from protruding from the front end portion of the front side frame is avoided. Therefore, there is no longer a need to elongate the front side frame, so that the length of the vehicle body can be minimized.

In the foregoing second embodiment of the disclosure, the front end portion of the subframe is connected to the front end portion of the front side frame by the subframe support portion, and the supporting oblique surface of the subframe support portion extends toward the first fragile portion.

Therefore, when a frontal collision occurs, the load input to the front end portion of the front side frame is transmitted to the first fragile portion and a component force of the load input to the front end portion of the subframe is transmitted along the supporting oblique surface from a forward lower location to the first fragile portion. Because the component force of the load is transmitted from the forward lower location to the first fragile portion, the component force of the load bends the first fragile portion upward.

Therefore, the first fragile portion will greatly bend and therefore can suitably absorb impact energy.

In the third embodiment of the disclosure, the first fragile portion includes the depression portion and the depression portion has a shape hollowed inward in the vehicle width direction. Therefore, due to the load transmitted from the front end portion of the front side frame, stress concentrates in the depression portion of the first fragile portion. Therefore, deformation of the first fragile portion toward an inward side in the vehicle width direction can be promoted. As the first fragile portion deforms inward in the vehicle width direction, the deformed first fragile portion is pressed against a motive power source (e.g., an engine) that is disposed inward in the vehicle width direction.

The pressed first fragile portion deforms along the motive power source, stretching in the vehicle body front-rear direction, and also crushes in the vehicle width direction. Thus, a large amount of deformation of the first fragile portion can be secured, so that the first fragile portion can more suitably absorb impact energy.

In the foregoing fourth embodiment of the disclosure, inside the subframe support portion, the bulkhead is provided below the supporting oblique surface. Furthermore, the collar nut is disposed inside the subframe support portion, the seat portion of the collar nut is joined to the bottom surface of the subframe support portion, and the upper portion of the collar nut is joined to the bulkhead.

Therefore, of the subframe support portion, a portion below the supporting oblique surface (hereinafter, referred to as lower-side support portion) is reinforced by the bulkhead and the collar nut, so that the rigidity of the lower-side support portion can be enhanced. This makes it possible to reduce the size of the sectional shape of the lower-side support portion and reduce the weight of the lower-side support portion (i.e., the weight of the subframe support portion).

Furthermore, since the fastening member is coupled to the collar nut, the subframe is connected to the bottom surface of the subframe support portion (i.e., the bottom surface of the lower-side support portion). The lower-side support portion is a portion that is high in rigidity.

Therefore, a component force of the load input to the front end portion of the subframe can be efficiently transmitted to the first fragile portion via the lower-side support portion and the supporting oblique surface. This increases the component force of the load which is transmitted to the first fragile portion so that the first fragile portion can be more suitably bent.

In the foregoing fifth embodiment of the disclosure, the bent portion of the subframe is provided with the second fragile portion, and the depression portion is formed in the second fragile portion. Furthermore, the depression portion has a shape that is hollowed from the outward side to the inward side in the vehicle width direction.

Therefore, due to the load transmitted from the front end portion of the subframe, stress concentrates in the depression portion of the second fragile portion. This promotes the bending of the second fragile portion, and therefore the subframe can be suitably bent downward at the second fragile portion.

Furthermore, the extension portion of the subframe extends forward substantially in the vehicle body front-rear direction. Therefore, when, during an early period of the frontal collision, the bumper beam or the bumper beam extension is crushed, the impact load can be transmitted from the extension portion to the second fragile portion.

That is, during an intermediate period of the frontal collision, the bending of the subframe can be promptly started. Therefore, the front side frame will be suitably bent in association with the bending of the left frame portion and therefore impact energy can be suitably absorbed.

In the sixth embodiment of the disclosure, the rear end portion of the subframe is fastened so as to be separable from the vehicle body frame by the impact load when the subframe is bent by impact load. Because impact load will separate the rear end portion of the subframe from the vehicle body frame, there is no risk of the subframe impeding the bending of the front side frame.

Therefore, during a terminal period of a frontal collision, the load transmitted to the front side frame will further bend the first fragile portion and therefore impact energy can be suitably absorbed.

In the foregoing seventh embodiment of the disclosure, the reinforcement portion has the reinforcement oblique surface and the reinforcement oblique surface extends obliquely from the side of the front end portion of the lower member toward the first fragile portion. Therefore, when a frontal collision occurs and impact load is input from the front of the vehicle body, the load transmitted to the reinforcement portion can be efficiently transmitted to the first fragile portion via the reinforcement oblique surface.

Furthermore, in the front side frame, a portion forward of the first fragile portion substantially in the vehicle body front-rear direction (i.e., a front end portion) is reinforced by the reinforcement portion. Therefore, the rigidity of the portion forward of the first fragile portion can be made higher than that of the first fragile portion. Hence, when a load is transmitted to the first fragile portion, the thus different rigidities of the first fragile portion and the portion forward of the first fragile portion allow the first fragile portion to bend more suitably.

In the eighth embodiment of the disclosure, the bumper beam is connected, via the bumper beam extension, to front portions of the front side frame, the reinforcement portion, and the lower member. Therefore, when a frontal collision occurs and an impact load is input from the front of the vehicle body, the bumper beam and the bumper beam extension will be crushed during an early period of the frontal collision, absorbing impact energy, and the remaining load can be dispersed to the front side frame and the lower member.

Therefore, the input impact load can be suitably supported by the front side frame and the lower member.

BRIEF DESCRIPTION OF THE DRAWINGS

The advantages of the disclosure will become apparent in the following description taken in conjunction with the following drawings.

DETAILED DESCRIPTION

Figure 1:
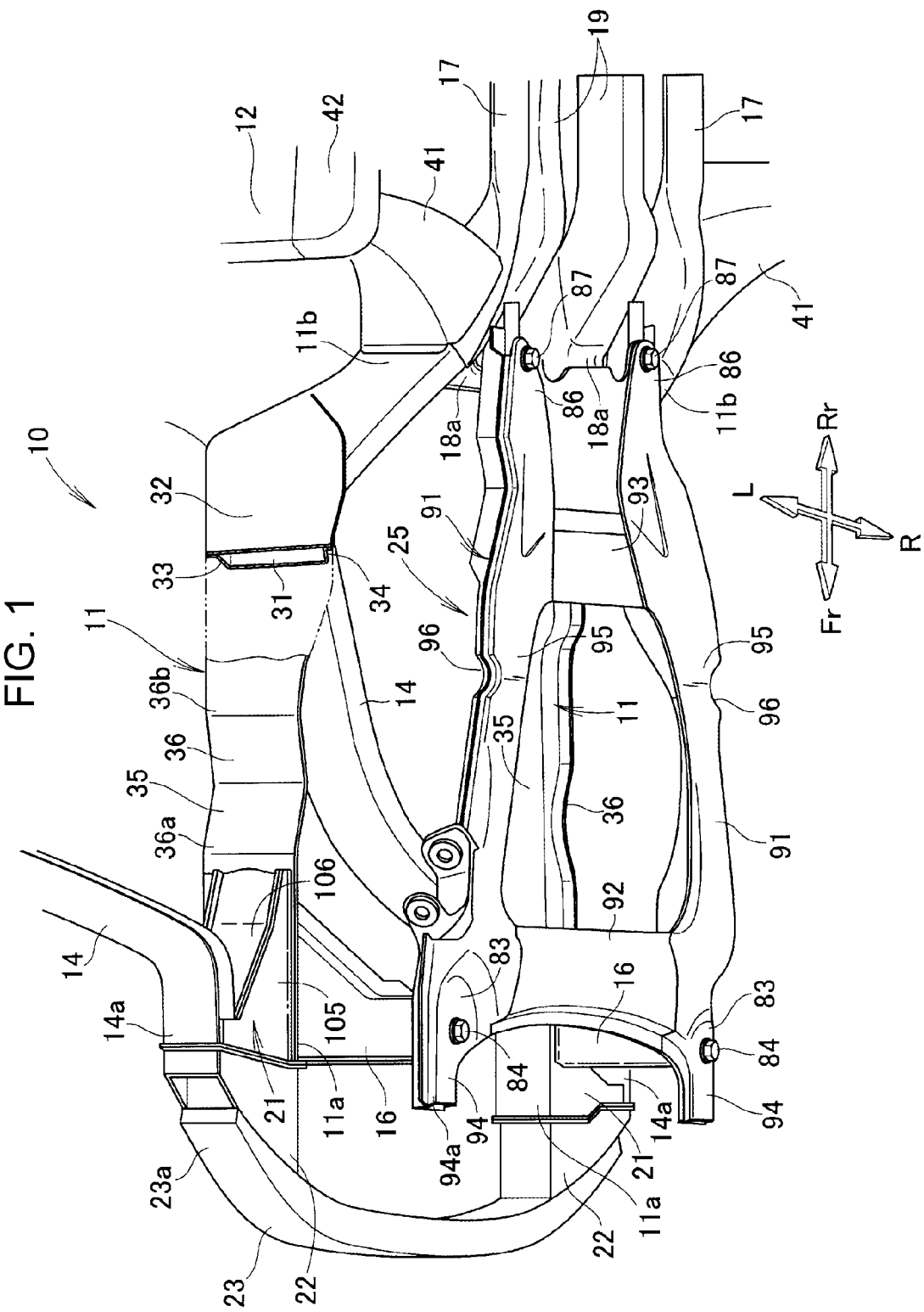
FIG. 1 is a perspective view of a vehicle front body structure according to one embodiment of the present disclosure, viewed from a lower left side.

Embodiments of the present disclosure will be described in detail below with reference to the accompanying drawings. Note that in the drawings, "front (Fr)", "rear (Rr)", "left (L)", and "right (R)" are based on the directions from a driver.

A vehicle front body structure 10 according to an embodiment of the present disclosure will be described. The vehicle front body structure 10 is substantially right-left symmetrical. Therefore, left-side members and right-side members are designated by the same reference characters, and the left-side members will be described in detail below while detailed descriptions of the right-side members are omitted.

Figure 2:
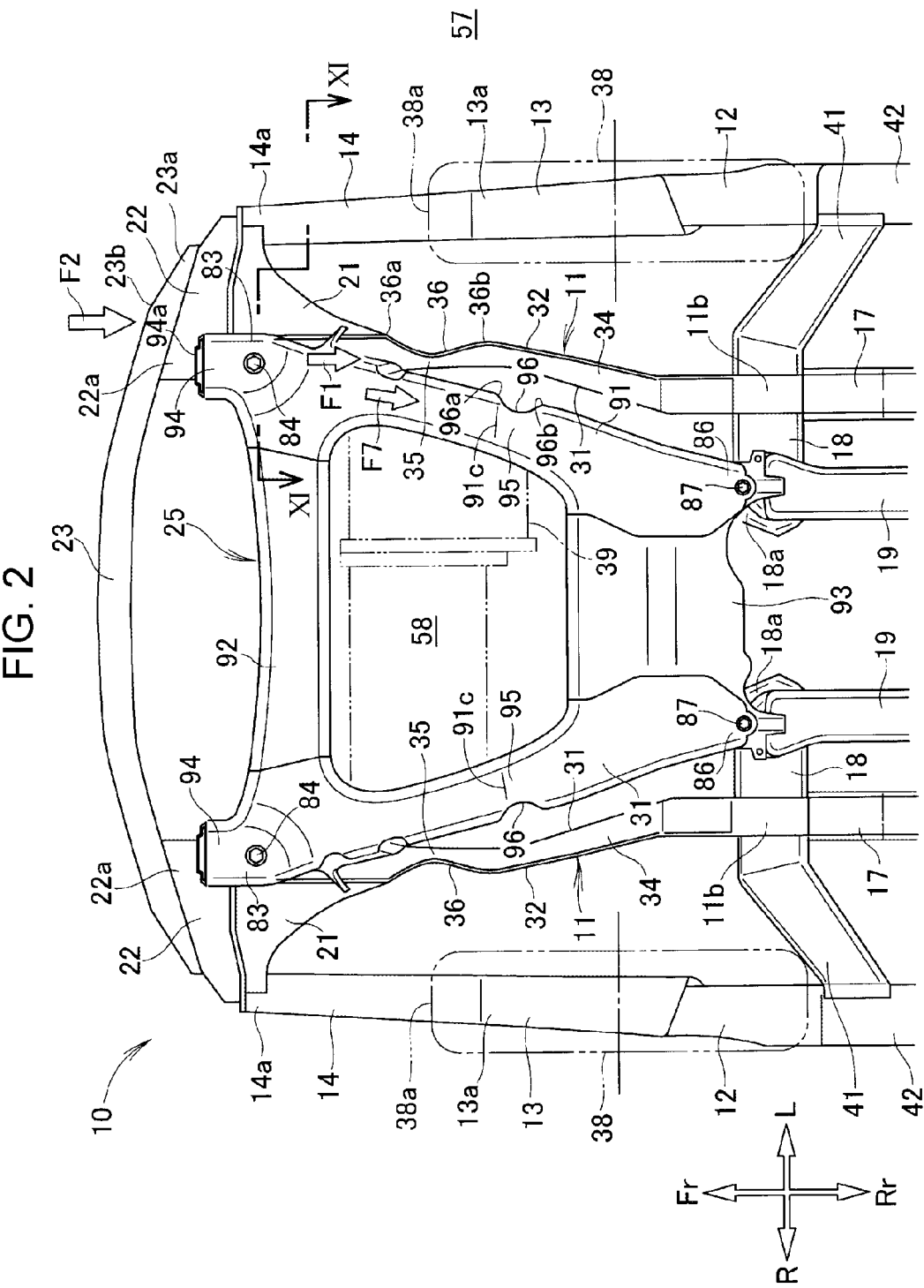
FIG. 2 is a bottom view of the vehicle front body structure shown in FIG. 1.

As shown in FIG. 1 and FIG. 2, the vehicle front body structure 10 includes a left front side frame 11 provided on a left side in a vehicle width direction, a left front pillar 12 up-standing at an outer side of the left front side frame 11 in the vehicle width direction, a left upper member 13 extending toward a front of the vehicle body (i.e., forward substantially in a vehicle body front-rear direction) from the left front pillar 12, a left lower member 14 extending from a front end portion 13a of the left upper member 13 to a location at an outward side of the left front side frame 11 in the vehicle width direction.

Furthermore, the vehicle front body structure 10 includes a left subframe support portion 16 extending vertically downward from a front end portion 11a of the left front side frame 11, a left floor frame 17 extending rearward substantially in the vehicle body front-rear direction from a rear end portion 11b of the left front side frame 11, a left floor member (vehicle body frame) 18 extending inward in the vehicle width direction from the rear end portion 11b of the left front side frame 11, and a left tunnel side frame 19 extending rearward from an inner end portion 18a of the left floor member 18.

The left tunnel side frame 19 extends rearward substantially in the vehicle body front-rear direction along a left side portion of a floor tunnel.

The vehicle front body structure 10 further includes a left reinforcement portion 21 interposed between a front end portion 14a of the left lower member 14 and the front end portion 11a of the left front side frame 11, a left bumper beam extension 22 provided on both the front end portion 11a of the left front side frame 11 and the front end portion 14a of the left lower member 14, a bumper beam 23 provided on the left bumper beam extension 22 and extending in the vehicle width direction, and a subframe 25 disposed below the left front side frame 11 and the right front side frame 11.

The left front side frame 11 is disposed at the left side in the vehicle width direction and extends in the vehicle body front-rear direction. The left front side frame 11 is formed by an inner wall 31, an outer wall 32, a top portion 33, and a bottom portion 34 so as to have a substantially quadrangular sectional shape. The left front side frame 11 has, in an intermediate portion thereof in the vehicle body front-rear direction, a first fragile portion 35.

The outer wall 32 of the first fragile portion 35 has, in an intermediate portion thereof in the vehicle body front-rear direction, a first depression portion (depression portion) 36. In the first depression portion 36, a portion between a depression portion's front end 36a and a depression portion's rear end 36b has a substantially curved depression shape that is hollowed inward in the vehicle width direction.

Because the outer wall 32 is provided with the first depression portion 36, it is possible to avoid interference of a front portion 38a of a left front wheel (road wheel) 38 with the left front side frame 11 (concretely, with the first fragile portion 35) when the left front wheel (road wheel) 38 is turned inward in the vehicle width direction.

The left front wheel 38 is provided at a side of an extra-vehicular space 57 of the left front side frame 11 (i.e., at the outward side in the vehicle width direction).

Furthermore, since the first fragile portion 35 is provided with the first depression portion 36, load F1 transmitted from the front of the vehicle body to the left front side frame 11 brings about concentration of stress in the first depression portion 36. Furthermore, since the first depression portion 36 is formed in a shape hollowed inward in the vehicle width direction, the deformation (bending) of the first fragile portion 35 inward in the vehicle width direction by the load F1 is promoted.

Because the first fragile portion 35 deforms inward in the vehicle width direction, the deformed first fragile portion 35 is pressed against an outer side surface of a motive power source (e.g., an engine) 39 that is disposed inward of the first fragile portion 35 in the vehicle width direction.

Figure 3:
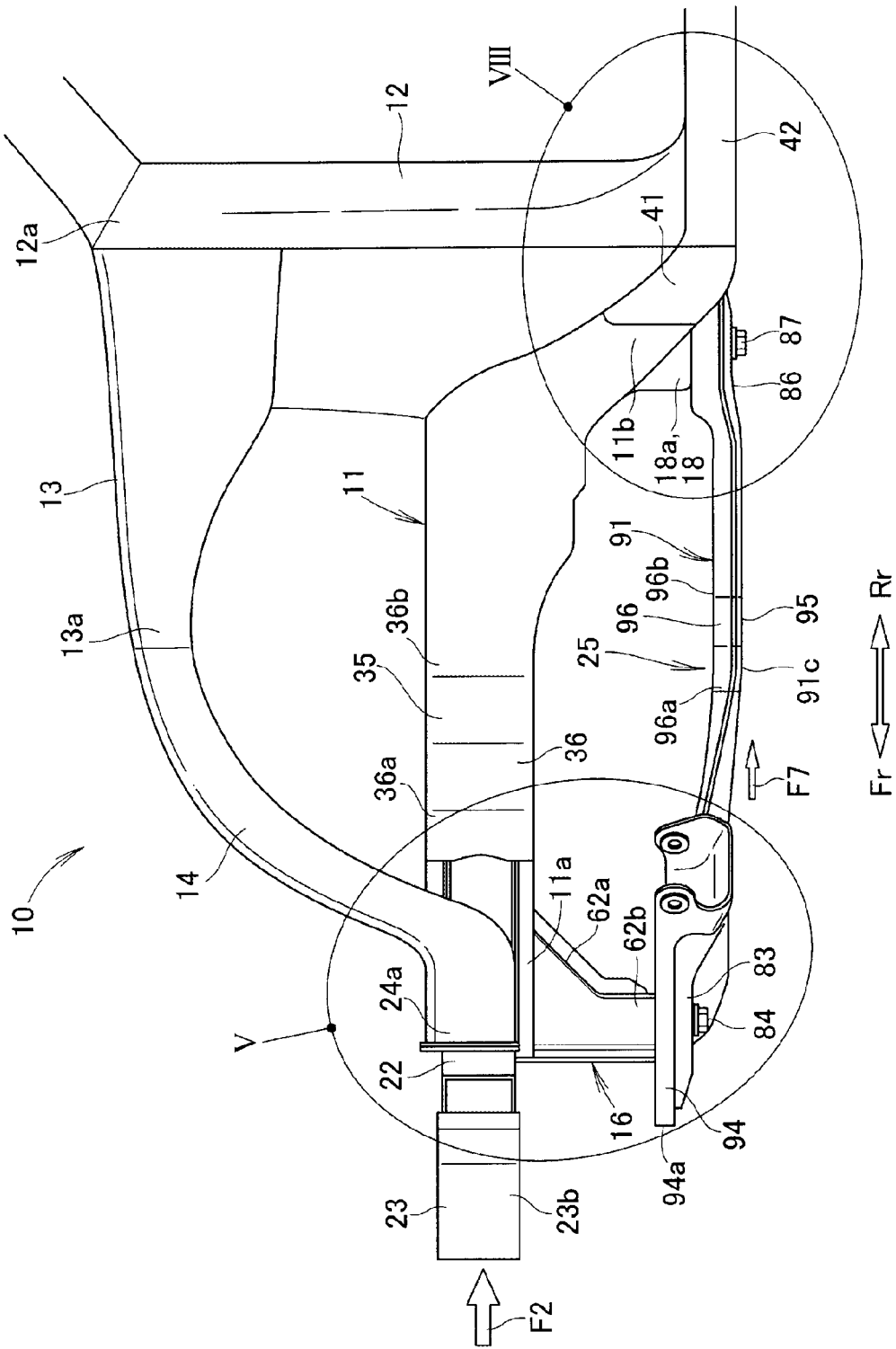
FIG. 3 is a side view of the vehicle front body structure shown in FIG. 1.

As shown in FIG. 3, a left outrigger 41 extends outward in the vehicle width direction from the rear end portion 11b of the left front side frame 11. From an outer end portion of the left outrigger 41, a left side sill 42 extends rearward substantially in the vehicle body front-rear direction. The left front pillar (concretely, a left lower front pillar) 12 stands from a front end portion of the left side sill 42.

An upper end portion 12a of the left front pillar 12 is positioned above the left front side frame 11. From the upper end portion 12a of the left front pillar 12, the left upper member 13 extends forward. The left lower member 14 extends from the front end portion 13a of the left upper member 13 to a location at an outward side of the left front side frame 11 in the vehicle width direction.

Figure 4:
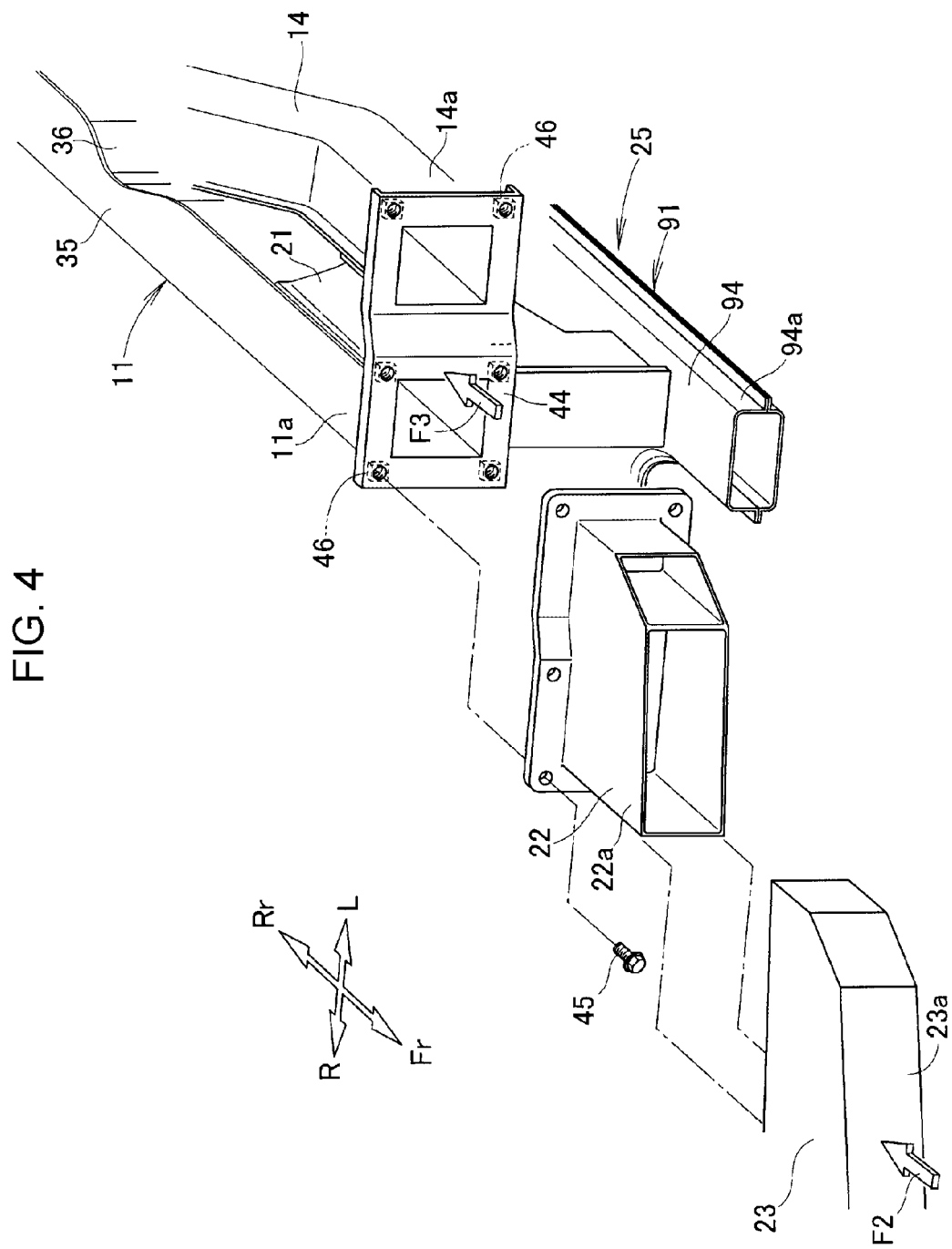
FIG. 4 is an exploded perspective view of a left bumper beam extension and a bumper beam shown in FIG. 1.

As shown in FIG. 4, a mounting bracket 44 is provided on both the front end portion 11a of the left front side frame 11 and the front end portion 14a of the left lower member 14. The mounting bracket 44 stands vertically and extends in the vehicle width direction. The left bumper beam extension 22 is fastened to the mounting bracket 44 from forward, by bolts 45 and nuts 46.

Therefore, the left bumper beam extension 22 juts out forward from the front end portion 11a of the left front side frame 11 and the front end portion 14a of the left lower member 14. A left end portion 23a of the bumper beam 23 is joined to a front end portion 22a of the left bumper beam extension 22.

The bumper beam 23 extends in the vehicle width direction, supported on the front end portion 22a of the left bumper beam extension 22 and a front end portion 22a of a right bumper beam extension 22 (see FIG. 2).

In this manner, the left bumper beam extension 22 is provided on the front end portion 11a of the left front side frame 11 and the front end portion 14a of the left lower member 14, and the left end portion 23a of the bumper beam 23 is provided on the left bumper beam extension 22.

That is, unlike the related art, a fragile portion that juts forward from the front end portion 11a of the left front side frame 11 is not provided in this embodiment. Because the left front side frame 11 is not provided with a fragile portion as provided in the related art, there is no longer a need for an elongated left front side frame 11 and therefore the length of the entire vehicle body can be minimized.

The bumper beam 23 is connected to front portions of the left front side frame 11, the left reinforcement portion 21 and the left lower member 14, via the left bumper beam extension 22. Therefore, when a frontal collision occurs and an impact load F2 is input from the front, the bumper beam 23 and the left bumper beam extension 22 crush during an early period of the frontal collision, absorbing impact energy.

A remaining load F3 is dispersed to the left front side frame 11, the left reinforcement portion 21, and the left lower member 14. Thus, the input impact load F2 is suitably supported by the left front side frame 11, the left reinforcement portion 21, and the left lower member 14.

Figure 5:
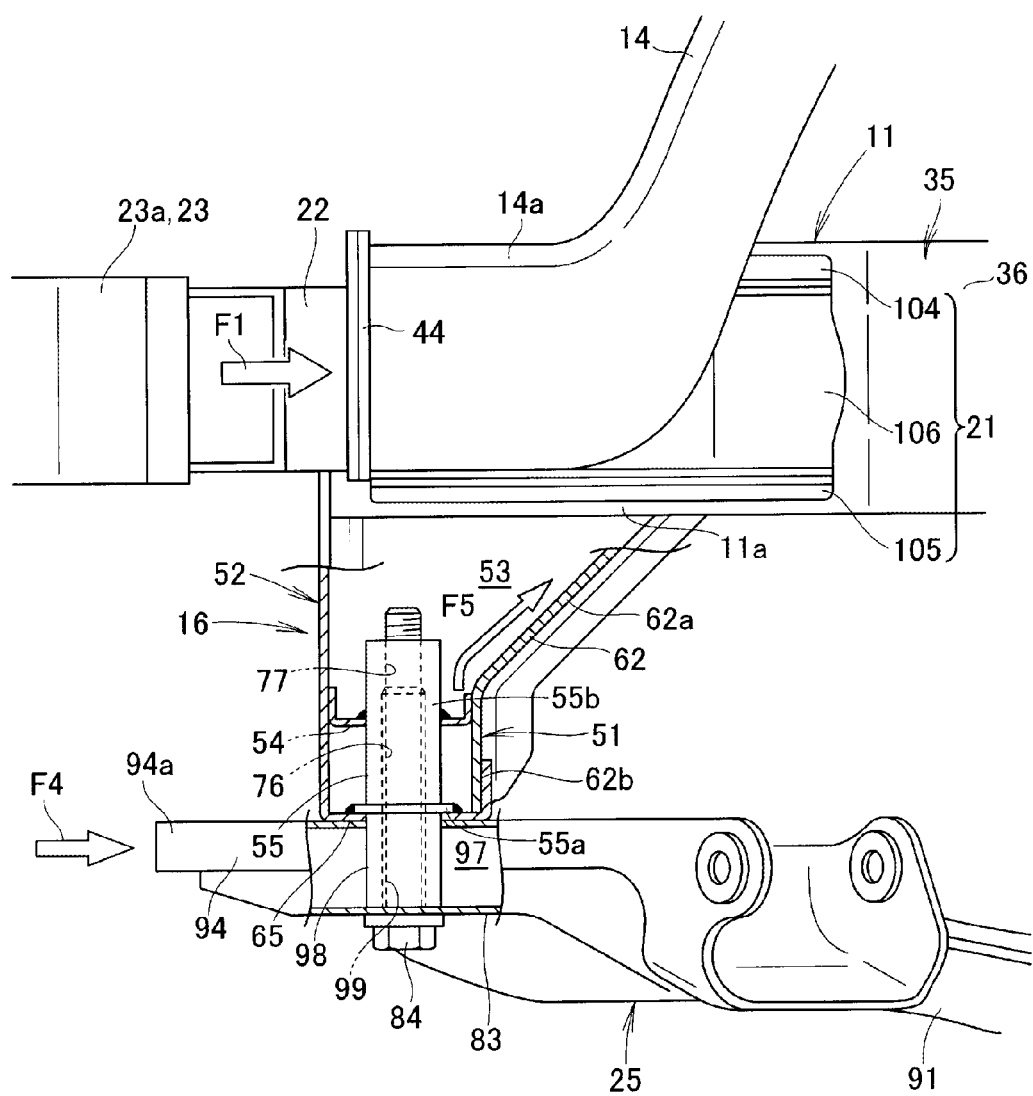
FIG. 5 is an enlarged extracted view of portions in a region V indicated in FIG. 3.
Figure 6:
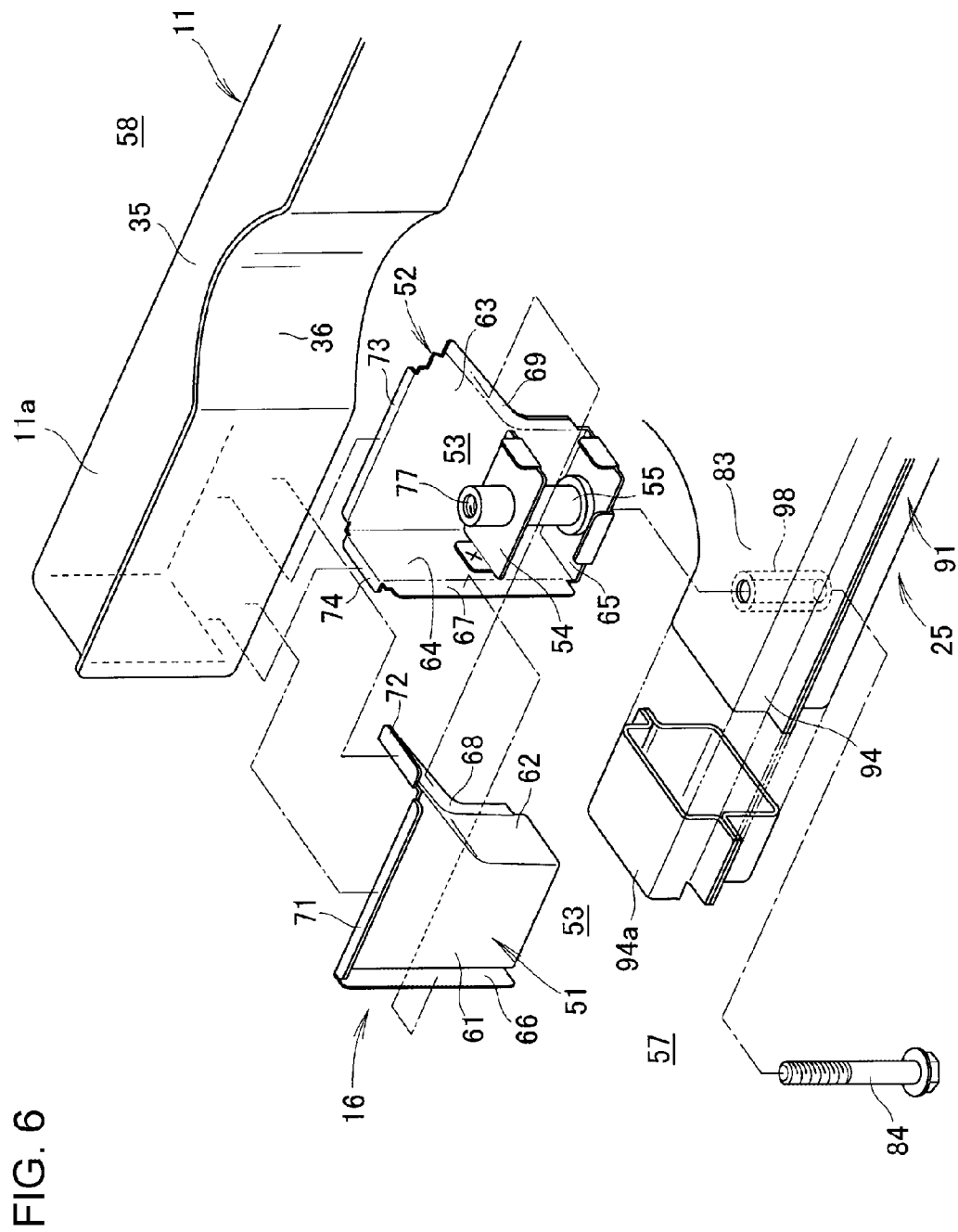
FIG. 6 is an exploded perspective view showing a front side frame, a left subframe support portion, and a subframe shown in FIG. 3.

As shown in FIGS. 5 and 6, the left subframe support portion 16 extends vertically downward from the front end portion 11a of the left front side frame 11.

The left subframe support portion 16 includes an outer-side bracket 51 provided at the outward side in the vehicle width direction, an inner-side bracket 52 provided at the inward side of the outer-side bracket 51 in the vehicle width direction, a bulkhead 54 provided in an inside 53 of the left subframe support portion 16, and a collar nut 55 supported by the bulkhead 54.

The outer-side bracket 51 has an outer bracket wall 61 that faces an extra-vehicular space 57 side and a rear bracket wall 62 bent and extending inward in the vehicle width direction from a rear end of the outer bracket wall 61. The outer-side bracket 51 is formed by the outer bracket wall 61 and the rear bracket wall 62 so as to have a substantially L sectional shape.

The inner-side bracket 52 has an inner bracket wall 63 that faces the side of an intra-vehicular space 58 side, a front bracket wall 64 bent and extending outward in the vehicle width direction from an front end of the inner bracket wall 63, and a bottom surface 65 provided on a lower end of the inner bracket wall 63 and a lower end of the front bracket wall 64. The inner-side bracket 52 is formed by the inner bracket wall 63 and the front bracket wall 64 so as to have a substantially L sectional shape.

Figure 7:
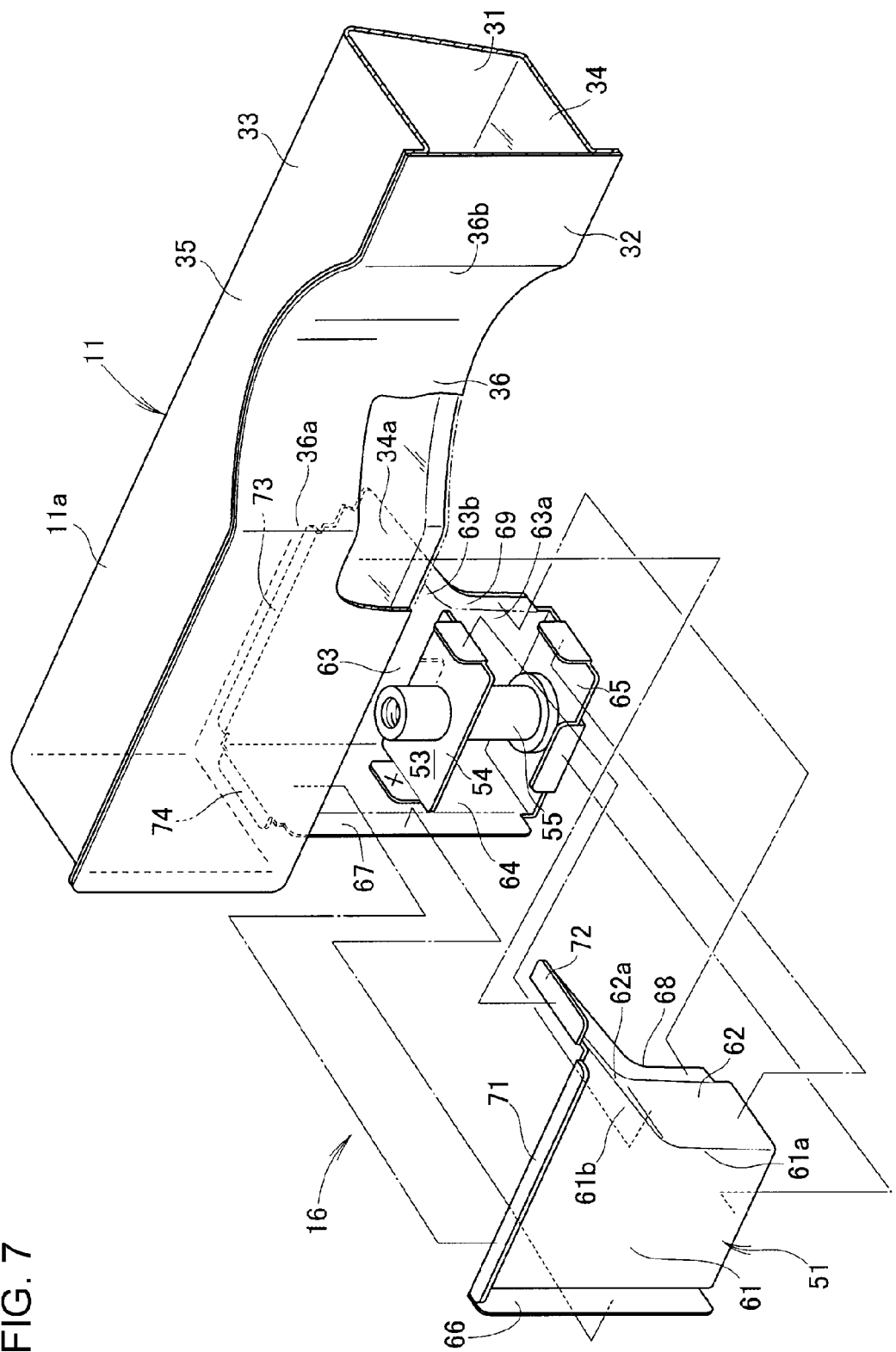
FIG. 7 is an exploded perspective view of the front side frame and the left subframe support portion shown in FIG. 6.

As shown in FIG. 7, as for the outer bracket wall 61, an upper half portion of a rear bounding edge 61a (hereinafter, referred to as upper rear bounding edge 61b) extends rearward substantially in the vehicle body front-rear direction on an ascending gradient from a lower half portion of the rear bounding edge 61a. As for the rear bracket wall 62, an upper half portion 62a of the rear bracket wall 62 is bent and extends on an ascending gradient rearward substantially in the vehicle body front-rear direction from a central portion of the rear bracket wall 62. Hereinafter, the upper half portion 62a of the rear bracket wall 62 will be referred to as "supporting oblique surface 62a" (see FIG. 5).

As for the inner bracket wall 63, an upper half portion of the rear bounding edge 63a (hereinafter, referred to as "upper rear bounding edge 63b") extends on an ascending gradient from a center portion of the rear bounding edge 63a to a rearward portion of the vehicle body.

A front flange 66 of the outer bracket wall 61 and a front flange 67 of the front bracket wall 64 are joined together. A rear flange 68 of the rear bracket wall 62 and a rear flange 69 of the inner bracket wall 63 are joined together. Thus, the outer-side bracket 51 and the inner-side bracket 52 form the left subframe support portion 16 so that the left subframe support portion 16 has a substantially quadrangular closed cross-section.

Furthermore, an upper flange 71 of the outer bracket wall 61, an upper flange 72 of the rear bracket wall 62, an upper flange 73 of the inner bracket wall 63, and an upper flange 74 of the front bracket wall 64 are joined from below to the bottom portion 34 of the front end portion 11a of the left front side frame 11.

In this state, the supporting oblique surface 62a extends rearward substantially in the vehicle body front-rear direction on an ascending gradient from a central portion of the rear bracket wall 62 to a lower end of the front end 36a of the first depression portion 36 (more specifically, to a portion 34a in the bottom portion 34 which is located at the lower end of the front end 36a of the first depression portion 36). The upper flange 72 of the outer bracket wall 61 is joined to the portion 34a from below.

The bulkhead 54 is disposed in the inside 53 of the left subframe support portion 16 and joined to front bracket wall 64 and the inner bracket wall 63 of the inner bracket 52 and the rear bracket wall 62 of the outer bracket 51. Thus, the bulkhead 54 is provided substantially horizontally in the inside 53 of the left subframe support portion 16, at a location below the supporting oblique surface 62a (see also FIG. 5)

Referring back to FIG. 5, the collar nut 55 is provided in the inside 53 of the left subframe support portion 16. The collar nut 55 is provided with a through hole 76 and therefore has a tubular shape. An upper portion of the through hole 76 is threaded to form a threaded hole 77. The collar nut 55 is disposed vertically in the inside 53 of the left subframe support portion 16. A seat portion 55a of the collar nut 55 is joined to the bottom surface 65 and an upper portion 55b of the collar nut 55 is joined to the bulkhead 54. Therefore, the collar nut 55 is supported vertically by the bottom surface 65 and the bulkhead 54.

In this state, the through hole 76 of the collar nut 55 is disposed coaxially with a mounting hole formed in the bottom surface 65.

Thus, in the inside 53 of the left subframe support portion 16, the bulkhead 54 is provided below the supporting oblique surface 62a. Furthermore, the seat portion 55a of the collar nut 55 is joined to the bottom surface 65 of the subframe support portion 16 and the upper portion 55b of the collar nut 55 is joined to the bulkhead 54.

Therefore, in the left subframe support portion 16, a portion below the supporting oblique surface 62a (hereinafter, referred to as "lower-side support portion") 62b is reinforced by the bulkhead 54 and the collar nut 55, so that the rigidity of the lower-side support portion 62b is increased. This makes it possible to reduce the size of the sectional shape of the lower-side support portion 62b and therefore reduce the weight of the lower-side support portion 62b (i.e., the weight of the subframe support portion 16).

Figure 8:
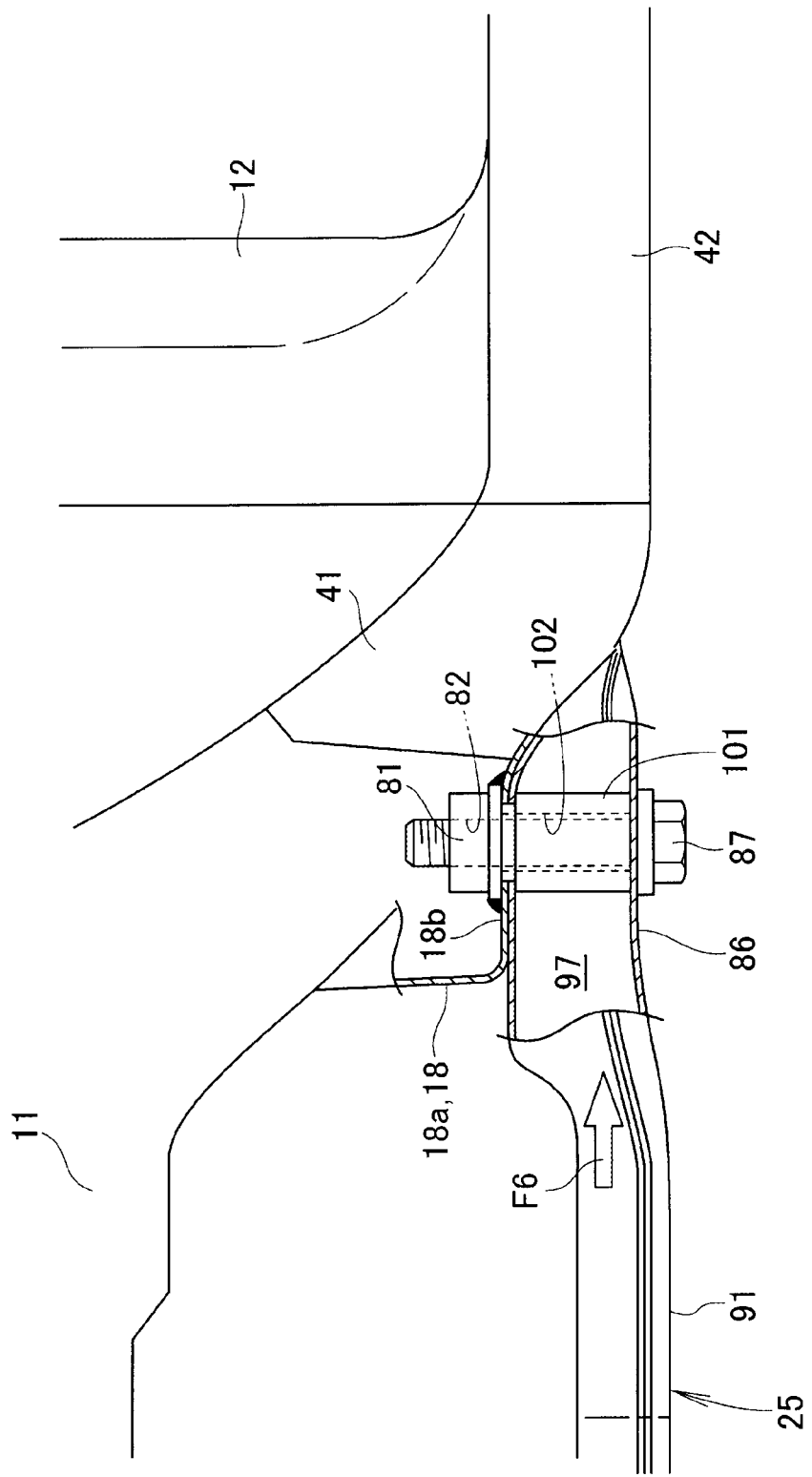
FIG. 8 is an enlarged extracted view of portions in a region VIII in FIG. 3.

As indicated in FIG. 8, a nut 81 is welded to a reverse surface 18b of the inner end portion 18a of the left floor member 18. In this state, a threaded hole 82 of the nut 81 is disposed coaxially with a mounting hole formed in the inner end portion 18a.

The nut 81 is mounted so as to be separable from the inner end portion 18a of the left floor member 18 when a predetermined load F6 (described later) acts.

Figure 9:
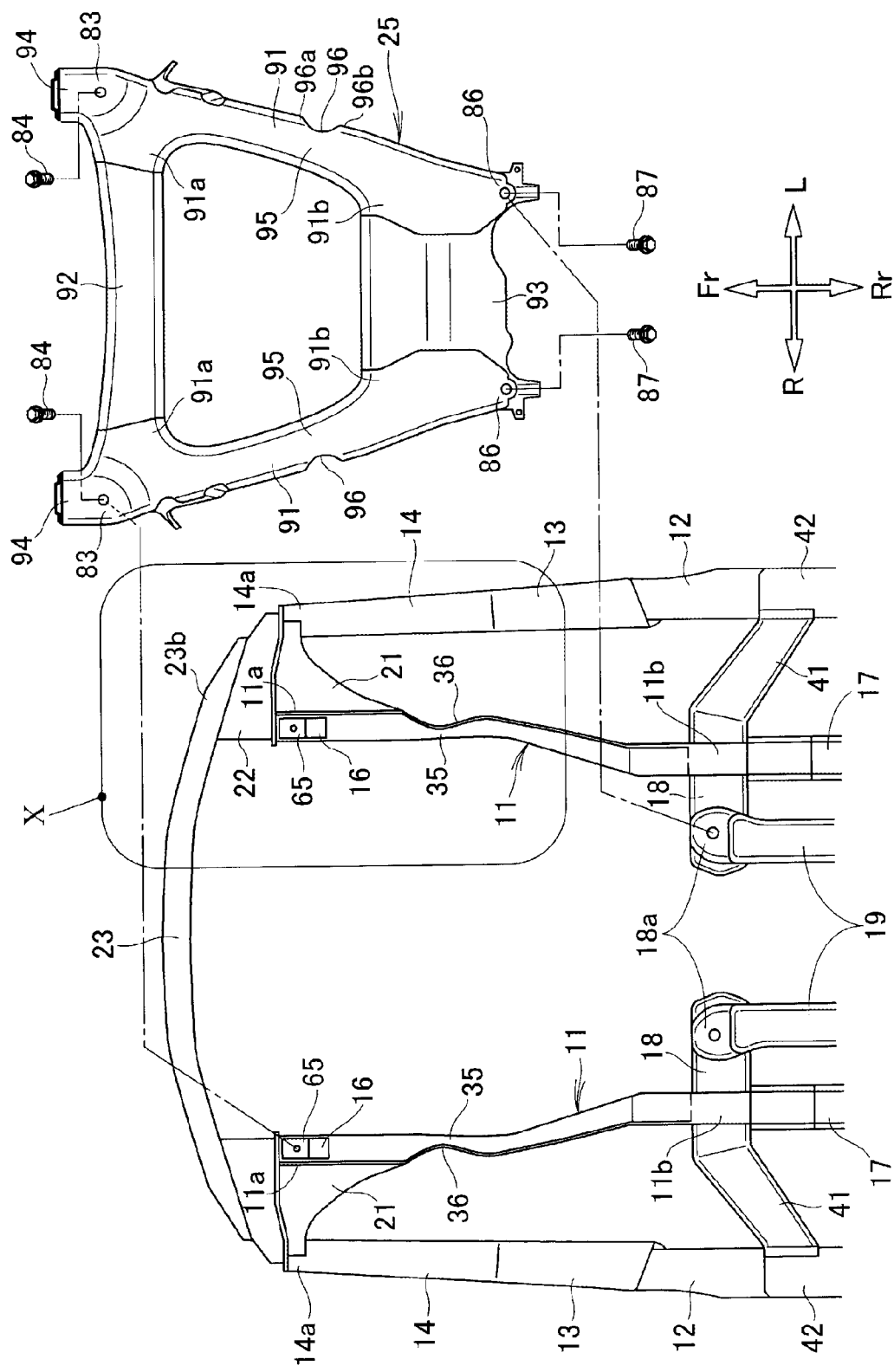
FIG. 9 is a bottom view of a subframe disassembled from the vehicle front body structure shown in FIG. 2.

As shown in FIG. 9, a left front mounting portion (front end portion) 83 of the subframe 25 is fastened to the bottom surface 65 of the left subframe support portion 16 by a front bolt (fastening member) 84. Likewise, a right front mounting portion (front end portion) 83 of the subframe 25 is fastened to the bottom surface 65 of the right subframe support portion 16 by a front bolt 84.

Furthermore, a left rear mounting portion 86 of the subframe 25 is fastened to the inner end portion 18a of the left floor member 18 by a rear bolt 87. Likewise, a right rear mounting portion 86 of the subframe 25 is fastened to the inner end portion 18a of a right floor member 18 by a rear bolt 87.

That is, the subframe 25 is provided below the left front side frame 11 and the right front side frame 11.

The subframe 25 includes a left frame portion 91 disposed below the left front side frame 11, a right frame portion 91 disposed below the right front side frame 11, a front member 92 connecting a front portion 91a of the left frame portion 91 and a front portion 91a of the right frame portion 91, and a rear member 93 connecting a rear portion 91b of the left frame portion and a rear portion 91b of the right frame portion 91.

The subframe 25 is formed by the left frame portion 91, the right frame portion 91, the front member 92, and the rear member 93 so as to have a substantially quadrangular and substantially left-right symmetrical shape in a plan view.

The left frame portion 91 is a hollow frame that extends from a location below the front end portion 11a of the left front side frame 11 to the inner end portion 18a of the left floor member 18 in an oblique manner in a plan view (see FIG. 4).

The left frame portion 91 includes the left front mounting portion 83 formed adjacent to a site of intersection with the front member 92, a left rear mounting portion 86 formed adjacent to a site of intersection with the rear member 93, an extension portion 94 that extends forward from the left front mounting portion 83, and a second fragile portion 95 formed in an intermediate portion of the left frame portion 91 in the vehicle body front-rear direction.

Referring back to FIG. 5, the left front mounting portion 83 is provided with a front collar 98 that is formed in an inside 97 of the left frame portion 91 and that vertically extends. In this state, the front collar 98 is disposed so that a through hole 99 of the front collar 98 is coaxial with an upper mounting hole and a lower mounting hole that are formed in the left front mounting portion 83. Furthermore, in a state where the left front mounting portion 83 is disposed in contact, from below, with the bottom surface 65 of the left subframe support portion 16, the front collar 98 is disposed so that the through hole 99 of the front collar 98 is coaxial with the through hole 76 of the collar nut 55.

The front bolt 84 is inserted through the through hole 99 of the front collar 98 from below. The thus inserted front bolt 84 is inserted from below into the through hole 76 of the collar nut 55. The inserted front bolt 84 is screwed to the threaded hole 77 of the collar nut 55. Therefore, the left front mounting portion 83 of the subframe 25 is fastened to the bottom surface 65 of the left subframe support portion 16 by the front bolt 84.

Note that the left subframe support portion 16 extends vertically downward from the front end portion 11a of the left front side frame 11. Therefore, the left front mounting portion 83 of the subframe 25 is fastened from below to the front end portion 11a of the left front side frame 11 via the left subframe support portion 16.

In this manner, the left frame portion 91 is connected to the bottom surface 65 of the left subframe support portion 16

(i.e., the bottom surface 65 of the lower-side support portion 62b). Note that the lower-side support portion 62b is a portion that has high rigidity.

Therefore, of the load F4 input to the extension portion 94 of the left frame portion 91, the component force F5 transmitted to the first fragile portion 35 via the left subframe support portion 16 can be increased.

Furthermore, the supporting oblique surface 62a of the subframe support portion 16 extends on an ascending gradient toward the first fragile portion 35. Therefore, the component force F5 is transmitted upward along the supporting oblique surface 62a from a front lower location to the first fragile portion 35.

Because the rigidity of the lower-side support portion 62b is enhanced in this manner, the component force F5 transmitted to the first fragile portion 35 via the left subframe support portion 16 can be increased. Furthermore, because the supporting oblique surface 62a extends on an ascending gradient toward the first fragile portion 35, the component force F5 of the load F4 is transmitted upward to the first fragile portion 35 via the lower-side support portion 62b and the supporting oblique surface 62a.

Because such a design as to increase the component force F5 and transmit the component force F5 upward to the first fragile portion 35 is provided, the first fragile portion 35 is bent upward by the component force F5.

That is, the load F1 input to the front end portion 11a of the left front side frame 11 bends the first fragile portion 35 in a vehicle width direction and the component force F5 input from the supporting oblique surface 62a bends the first fragile portion 35 upward. Thus, the first fragile portion 35 is greatly bent.

Furthermore, as shown in FIG. 8, the left rear mounting portion 86 is provided with a rear collar 101 that is formed in an inside 97 of the left frame portion 91 and that vertically extends. In this state, the rear collar 101 is disposed so that a through hole 102 formed in the rear collar 101 is coaxial with an upper mounting hole and a lower mounting hole that are formed in the left rear mounting portion 86.

Furthermore, while the left rear mounting portion 86 is placed in contact, from below, with the inner end portion 18a of the left floor member 18, the rear collar 101 is disposed so that the through hole 102 of the rear collar 101 is coaxial with the threaded hole 82 of the nut 81.

The rear bolt 87 is inserted through the through hole 102 of the rear collar 101 from below. The inserted rear bolt 87 is screwed to the threaded hole 82 of the nut 81 from below. Therefore, the left rear mounting portion 86 of the subframe 25 is fastened to the inner end portion 18a of the left floor member 18 from below by the rear bolt 87.

Note that the nut 81 is mounted on the inner end portion 18a of the left floor member 18 so as to be separable from the inner end portion 18a when a predetermined load (i.e., a component force) F6 is transmitted from the front of the vehicle body to the left rear mounting portion 86 of the left frame portion 91.

Specifically, the second fragile portion 95 of the left frame portion 91 is bent downward by a load (i.e., a component force) F7 (see FIG. 3). In this state, the component force F6 is transmitted from the front of the vehicle body to the left rear mounting portion 86 of the left frame portion 91 and the component force F6 transmitted to the left rear mounting portion 86 is transmitted to the rear bolt 87. The component force F6 transmitted to the rear bolt 87 separates the nut 81, together with the rear bolt 87, from the inner end portion 18a of the left floor member 18.

Because the left rear mounting portion 86 of the left frame portion 91 will be separated from the inner end portion 18a of the left floor member 18 by the component force F6 in this manner, there is no risk of the left frame portion 91 impeding the bending of the left front side frame 11.

Therefore, when a frontal collision occurs and an impact load is input from the front of the vehicle body, the load (component force) transmitted to the left front side frame 11 further bends the first fragile portion 35 (see FIG. 3) during a terminal period of the frontal collision.

As shown in FIGS. 2 and 3, an intermediate portion of the left frame portion 91 in the vehicle body front-rear direction is provided with a bent portion 91c. The bent portion 91c is provided with the second fragile portion 95. The bent portion 91c is a portion that has been bent downward and that is to be further bent downward by an impact load at the time of a frontal collision.

The second fragile portion 95 includes a second depression portion (depression portion) 96 which is formed in the bent portion 91c. The second depression portion 96 is formed at an outward site in the second fragile portion 95 in the vehicle width direction and a portion between a depression front end 96a and a depression rear end 96b of the second depression portion 96 is substantially concavely hollowed inward in the vehicle width direction.

Therefore, when the component force F7 is transmitted from the extension portion 94 of the left frame portion 91, stress concentrates in the second depression portion 96. This promotes the bending of the second fragile portion 95 although the left frame portion 91 extends rearward obliquely in a plan view. Because the bending of the second fragile portion 95 is promoted in this manner, the left frame portion 91 will be suitably bent downward at the second fragile portion 95.

Furthermore, the extension portion 94 extends forward from the left front mounting portion 83 of the left frame portion 91. The extension portion 94 has a substantially quadrangular closed cross-section (see FIG. 6) and extends further forward than the front end portion 11a of the left front side frame 11.

Concretely, a front edge portion 94a of the extension portion 94 is disposed so as to coincide with a front surface 23b of the bumper beam 23 in terms of the position in the vehicle body front-rear direction when the bumper beam 23 and the left bumper beam extension 22 are crushed by the impact load F2 of a frontal collision.

Therefore, when a frontal collision occurs and the impact load F2 is input from the front, the bumper beam 23 and the left bumper beam extension 22 crush during an early period of the frontal collision and part of the impact load F2 is transmitted from the extension portion 94 of the left frame portion 91 to the second fragile portion 95 of the left frame portion 91.

Because during an early period of a frontal collision, part of the impact load F2 is transmitted from the extension portion 94 to the second fragile portion 95, the bending of the second fragile portion 95 (i.e., of the left frame portion 91) will promptly start during an intermediate period of the frontal collision. Therefore, the left front side frame 11 will suitably bend in association with the bending of the left frame portion 91.

Figure 10:
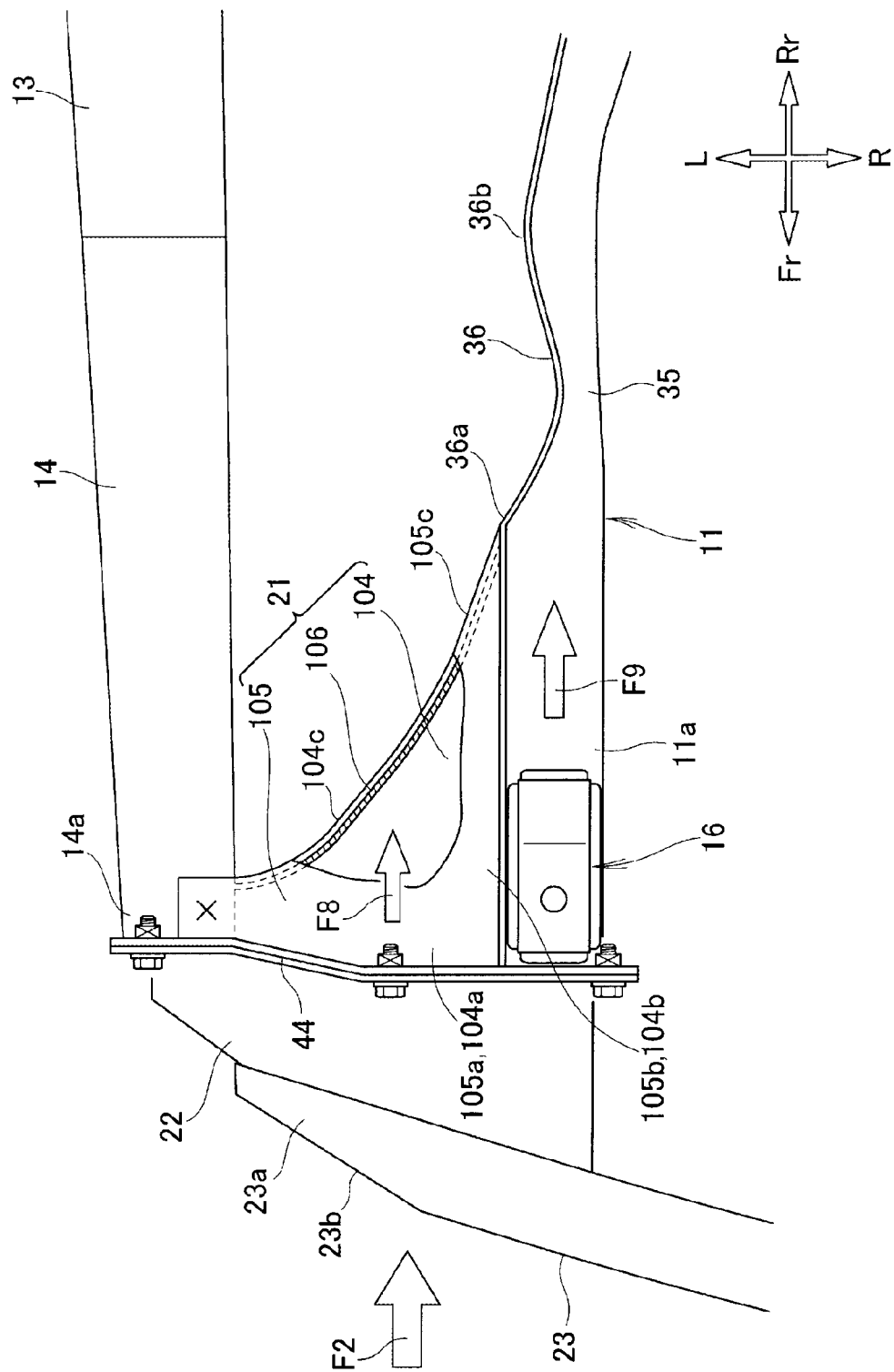
FIG. 10 is an enlarged view of a region X indicated in FIG. 9.
Figure 11:
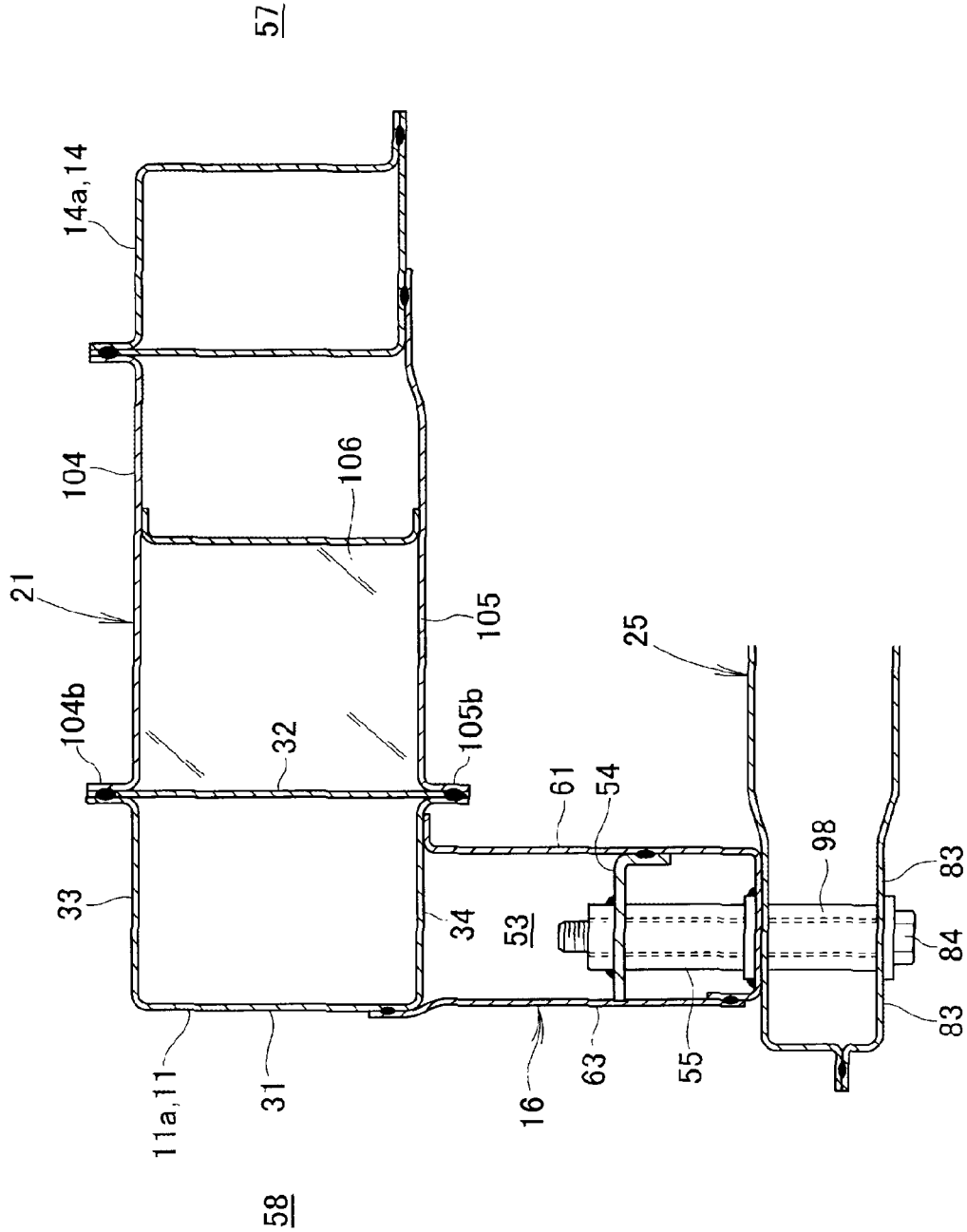
FIG. 11 is a section view taken on line XI-XI in FIG. 2.

As shown in FIGS. 10 and 11, the left reinforcement portion 21 is interposed between the front end portion 14a of the left lower member 14 and the front end portion 11a of the left front side frame 11. The left reinforcement portion 21 includes an upper-side bracket 104, a lower-side bracket 105, and an oblique wall portion 106.

The upper-side bracket 104 is formed by an upper front bounding edge 104*a*, an upper inner bounding edge 104*b*, and an upper oblique bounding edge 104*c* so as to have a substantially triangular shape in a plan view. The lower-side bracket 105, shaped similarly to the upper-side bracket 104, is formed by a lower front bounding edge 105*a*, a lower inner bounding edge 105*b*, and a lower oblique bounding edge 105*c* so as to have a substantially triangular shape in a plan view.

The upper front bounding edge 104*a* of the upper-side bracket 104 and the lower front bounding edge 105*a* of the lower-side bracket 105 are joined to the mounting bracket 44 (see also FIG. 4) from the rear substantially in the vehicle body front-rear direction. Furthermore, the upper inner bounding edge 104*b* of the upper-side bracket 104 and the lower inner bounding edge 105*b* of the lower-side bracket 105 are joined to the front end portion 11*a* of the left front side frame 11 from the outward side in the vehicle width direction.

Further, the upper oblique bounding edge 104*c* of the upper-side bracket 104 and the lower oblique bounding edge 105*c* of the lower-side bracket 105 extend obliquely from the front end portion 14*a* of the left lower member 14 toward the first fragile portion 35.

The oblique wall portion 106 is interposed between the upper oblique bounding edge 104*c* of the upper-side bracket 104 and the lower oblique bounding edge 105*c* of the lower-side bracket 105. Further, the oblique wall portion 106 extends obliquely inward in the vehicle width direction, along the upper oblique bounding edge 104*c* and the lower oblique bounding edge 105*c* from the front end portion 14*a* of the left lower member 14 toward the first fragile portion 35.

This oblique wall portion 106 forms a reinforcement oblique surface of the left reinforcement portion 21. In the following description, the oblique wall portion 106 is referred to as the reinforcement oblique surface 106 of the left reinforcement portion 21.

That is, the left reinforcement portion 21 has a substantially triangular shape in a plan view. The left reinforcement portion 21 connects the front end portion 11*a* of the left front side frame 11 and the front end portion 14*a* of the left lower member 14.

Furthermore, the reinforcement oblique surface 106 of the left reinforcement portion 21 extends obliquely from the front end portion 14*a* of the left lower member 14 to the first fragile portion 35.

The upper front bounding edge 104*a* of the upper-side bracket 104 and the lower front bounding edge 105*a* of the lower-side bracket 105 are joined to the mounting bracket 44. Therefore, the left end portion 23*a* of the bumper beam 23 is connected, via the left bumper beam extension 22, to a front portion of the front end portion 11*a* of the left front side frame 11, a front portion of the left reinforcement portion 21, and a front portion of the front end portion 14*a* of the left lower member 14.

In this state, the reinforcement oblique surface 106 of the left reinforcement portion 21 extends obliquely from the front end portion 14*a* of the left lower member 14 to the first fragile portion 35. Therefore, when a frontal collision occurs and an impact load F2 is input from the front, the load (component force) F8 dispersed to the left reinforcement portion 21 is efficiently transmitted to the first fragile portion 35 via the reinforcement oblique surface 106.

The upper inner bounding edge 104*b* of the upper-side bracket 104 and the lower inner bounding edge 105*b* of the lower-side bracket 105 are joined to the front end portion 11*a* of the left front side frame 11 from the outward side in the vehicle width direction.

Note that the front end portion 11*a* of the left front side frame 11 is a portion forward of the first fragile portion 35 substantially in the vehicle body front-rear direction. That is, in the left front side frame 11, the portion 11*a* forward of the first fragile portion 35 is reinforced by the left reinforcement portion 21.

Therefore, the portion 11*a* forward of the first fragile portion 35 has a higher rigidity than the first fragile portion 35. Due to this, when the load (component force) F9 is transmitted to the first fragile portion 35, the different rigidities of the first fragile portion 35 and the portion 11*a* forward of the first fragile portion 35 cause the first fragile portion 35 to bend more suitably.

Next, an example case in which impact load F10 input to the vehicle front body structure 10 due to a frontal collision is absorbed by the left front side frame 11, the left frame portion 91, etc. will be described with reference to FIG. 12A to FIG. 15.

Figure 12A:
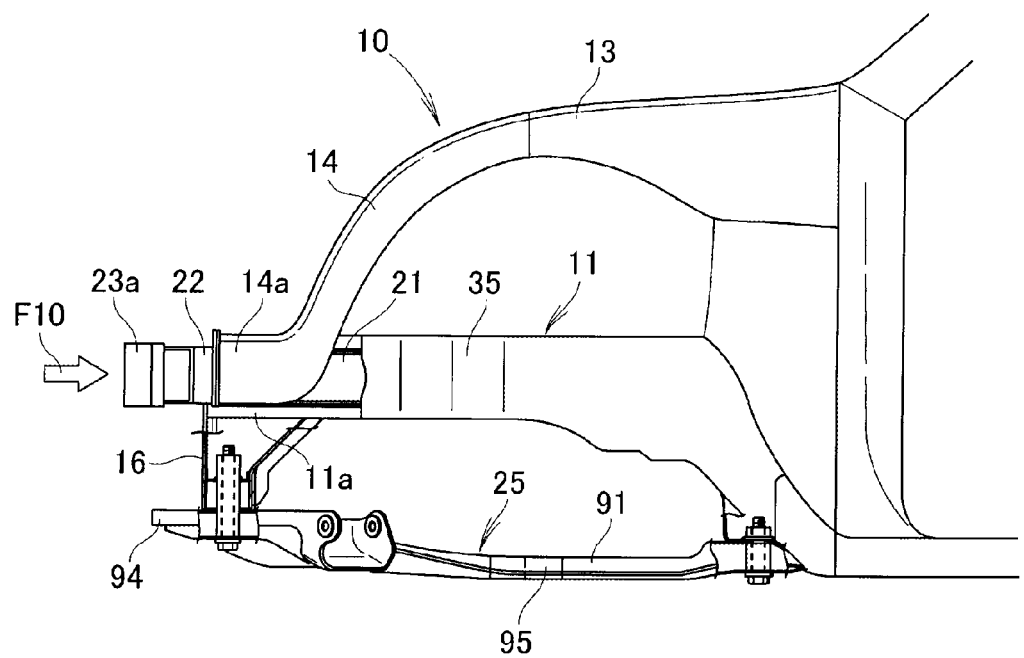
FIGS. 12A and 12B illustrate an example case where impact load of a frontal collision is input to a vehicle front body structure according to one embodiment of the present disclosure.
Figure 12B:
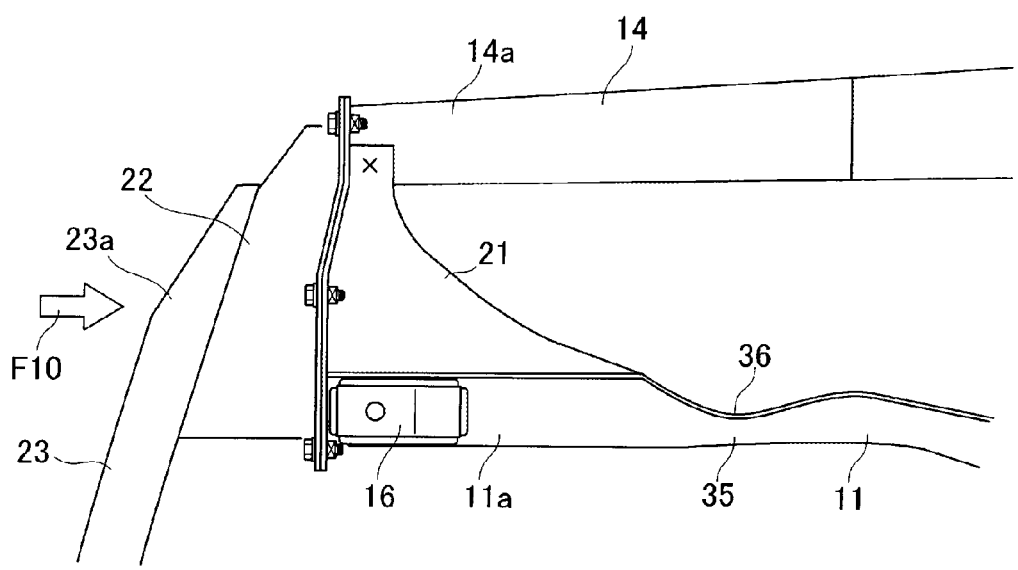

As shown in FIGS. 12A and 12B, when a frontal collision occurs on the vehicle front body structure 10, the impact load F10 is input to the left end portion 23*a* of the bumper beam 23 during an early period of the frontal collision. The impact load F10 input to the left end portion 23*a* is transmitted to the left bumper beam extension 22.

The left end portion 23*a* of the bumper beam 23 will be hereinafter referred to as bumper beam left end portion 23*a*.

Figure 13A:
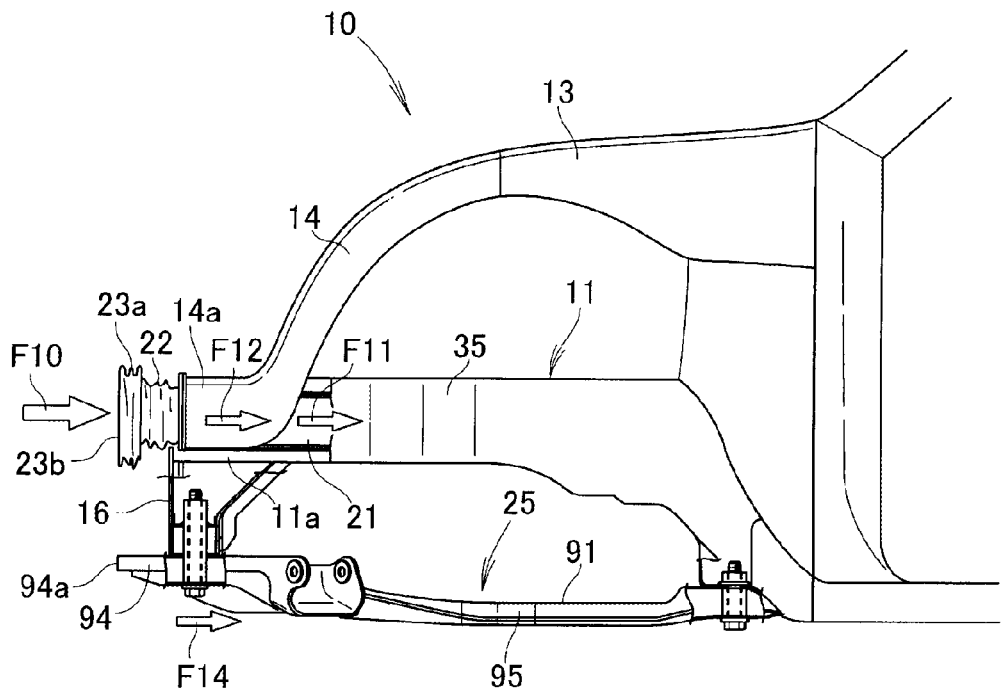
FIGS. 13A and 13B illustrate an example case where a left end portion and a left beam extension in the vehicle front body structure according to one embodiment of the present disclosure crush in an early period of a frontal collision.
Figure 13B:
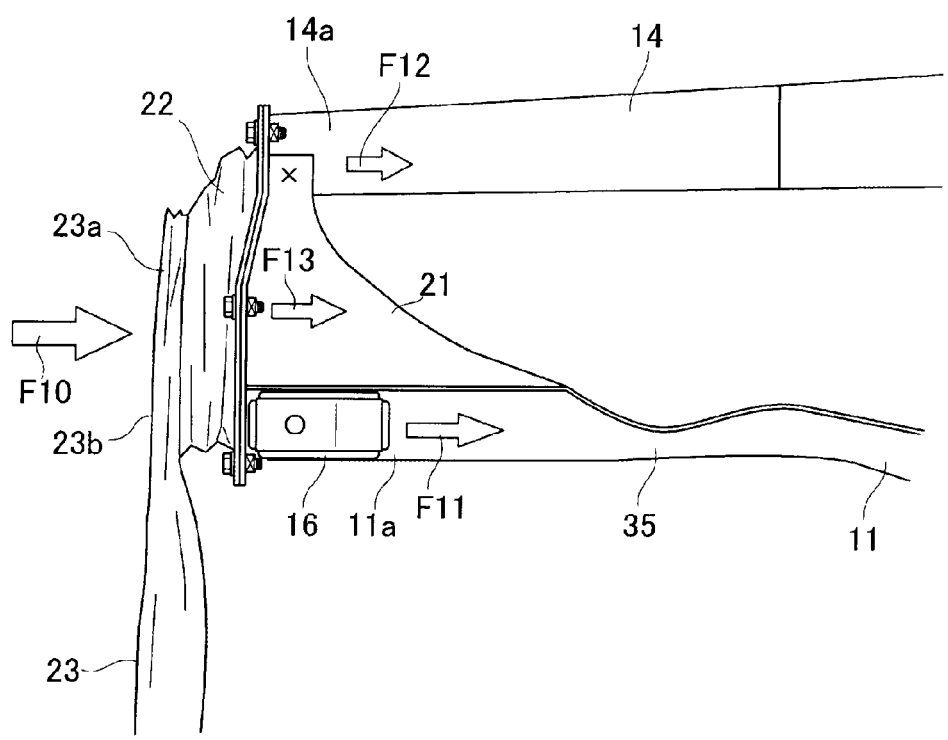

As shown in FIGS. 13A and 13B, during the early period of the frontal collision, the input impact load F10 crushes the bumper beam left end portion 23*a* and the left bumper beam extension 22. As the bumper beam left end portion 23*a* and the left bumper beam extension 22 crush, part of the impact load F10 is absorbed.

Furthermore, because the bumper beam left end portion 23*a* and the left bumper beam extension 22 crush, the front surface 23*b* of the bumper beam left end portion 23*a* comes to the same position as the front edge portion 94*a* of the extension portion 94 of the left frame portion 91 in the vehicle body front-rear direction.

Therefore, the remaining load of the impact load F10 is dispersed from the left bumper beam extension 22 to the front end portion 11*a* of the left front side frame 11, the front end portion 14*a* of the left lower member 14, the left reinforcement portion 21, and the front edge portion 94*a* of the extension portion 94.

In the following description, the load dispersed to the front end portion 11*a* of the left front side frame 11 is referenced by F11 and the load dispersed to the front end portion 14*a* of the left lower member 14 is referenced by F12. Furthermore, the load dispersed to the left reinforcement portion 21 is referenced by F13 and the load dispersed to the front edge portion 94*a* of the extension portion 94 is referenced by F14.

Figure 14A:
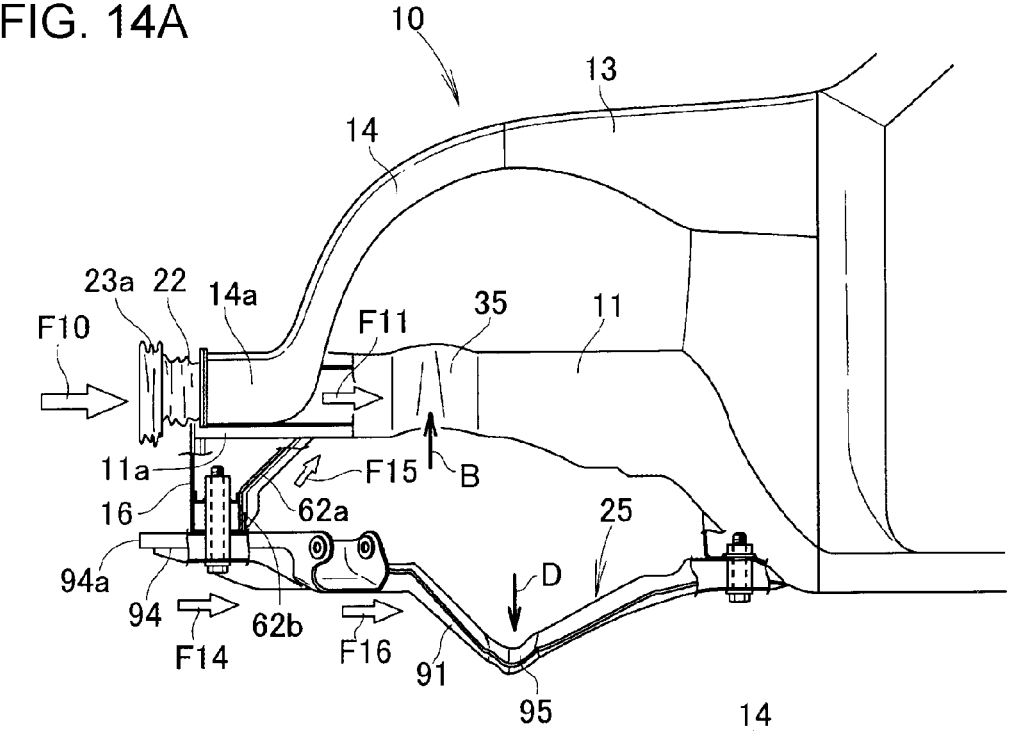
FIGS. 14A to 14C illustrate an example case where the left front side frame and a left frame portion of the subframe in the vehicle front body structure according to one embodiment of the present disclosure bend in an intermediate period of the frontal collision.
Figure 14B:
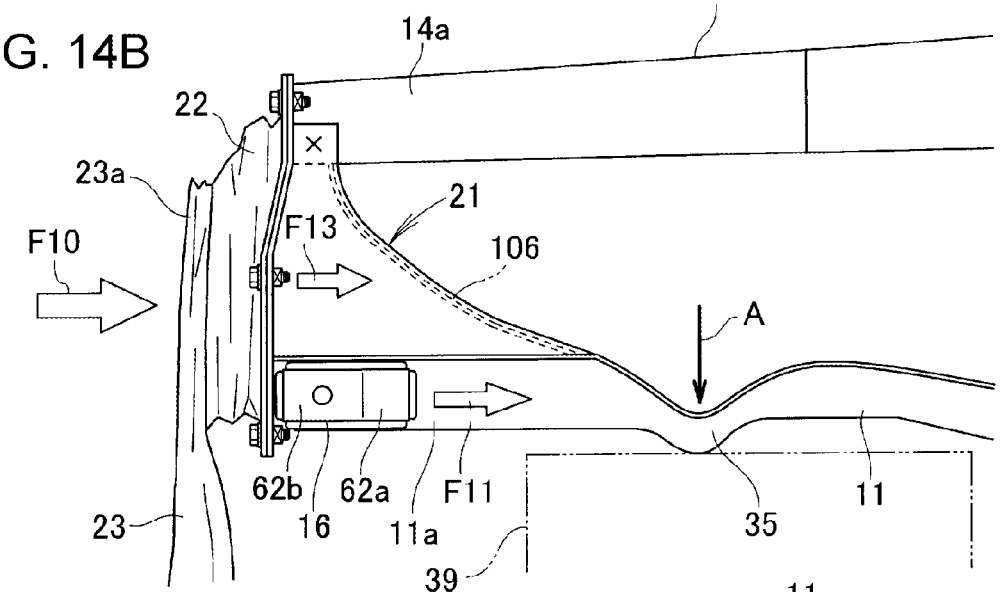

As shown in FIGS. 14A and 14B, during an intermediate period of the frontal collision, the load F11 input to the front end portion 11*a* of the left front side frame 11 is transmitted to the first fragile portion 35.

Note that the reinforcement oblique surface 106 of the left reinforcement portion 21 extends obliquely from the front end portion 14*a* of the left lower member 14 to the first fragile portion 35. Therefore, the load F13 transmitted to the left reinforcement portion 21 is transmitted to the first fragile portion 35 of the left front side frame 11 via the reinforcement oblique surface 106.

Then, due to the load F11 and the load F13, the first fragile portion 35 is bent inward in the vehicle width direction as indicated by an arrow A.

The subframe support portion 16 has high rigidity in the lower-side support portion 62b and the supporting oblique surface 62a extends obliquely toward the first fragile portion 35. Therefore, a component force F15 of a load F14 input to the front edge portion 94a of the extension portion 94 is transmitted from a front lower location to the first fragile portion 35 along the supporting oblique surface 62a.

Hence, by the component force F15, the first fragile portion 35 is bent upward as indicated by an arrow B.

That is, the first fragile portion 35 is suitably bent inward in the vehicle width direction by the load F11 and the load F13 and is bent upward by the component force F15. Thus, the first fragile portion 35 is bent upward and inward in the vehicle width direction, so that the first fragile portion 35 is greatly bent.

Figure 14C:
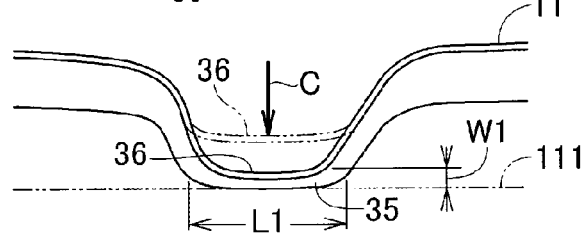

Furthermore, as shown in FIG. 14C, because the first fragile portion 35 is bent inward in the vehicle width direction, the bent first fragile portion 35 is pressed against the motive power source 39 disposed inward in the vehicle width direction.

The first fragile portion 35 pressed against the motive power source 39 deforms along the motive power source 39 to stretch in the vehicle body front-rear direction, so that a large length L1 of the first fragile portion 35 in contact with the motive power source 39 is secured.

Furthermore, since the first fragile portion 35 is pressed against the motive power source 39, the first fragile portion 35 crushes from a state indicated by imaginary lines to the inward side in the vehicle width direction (i.e., to the motive power source 39 side) as indicated by an arrow C. Therefore, the width W1 of the first fragile portion 35 reduces.

Thus, the first fragile portion 35 is bent upward and inward in the vehicle width direction and the first fragile portion 35 is crushed inward in the vehicle width direction, so that a large amount of deformation of the first fragile portion 35 can be secured.

Because a large amount of deformation of the first fragile portion 35 is secured in this manner, the deformation of the first fragile portion 35 will suitably absorb impact energy.

Referring back to FIG. 14A, a component force F16 of the load F14 input to the front edge portion 94a of the extension portion 94 is transmitted to the second fragile portion 95 of the left frame portion 91.

Therefore, the left frame portion 91 is bent at the second fragile portion 95 downward as indicated by an arrow D. Thus, impact energy can be stably absorbed by the second fragile portion 95.

Figure 15:
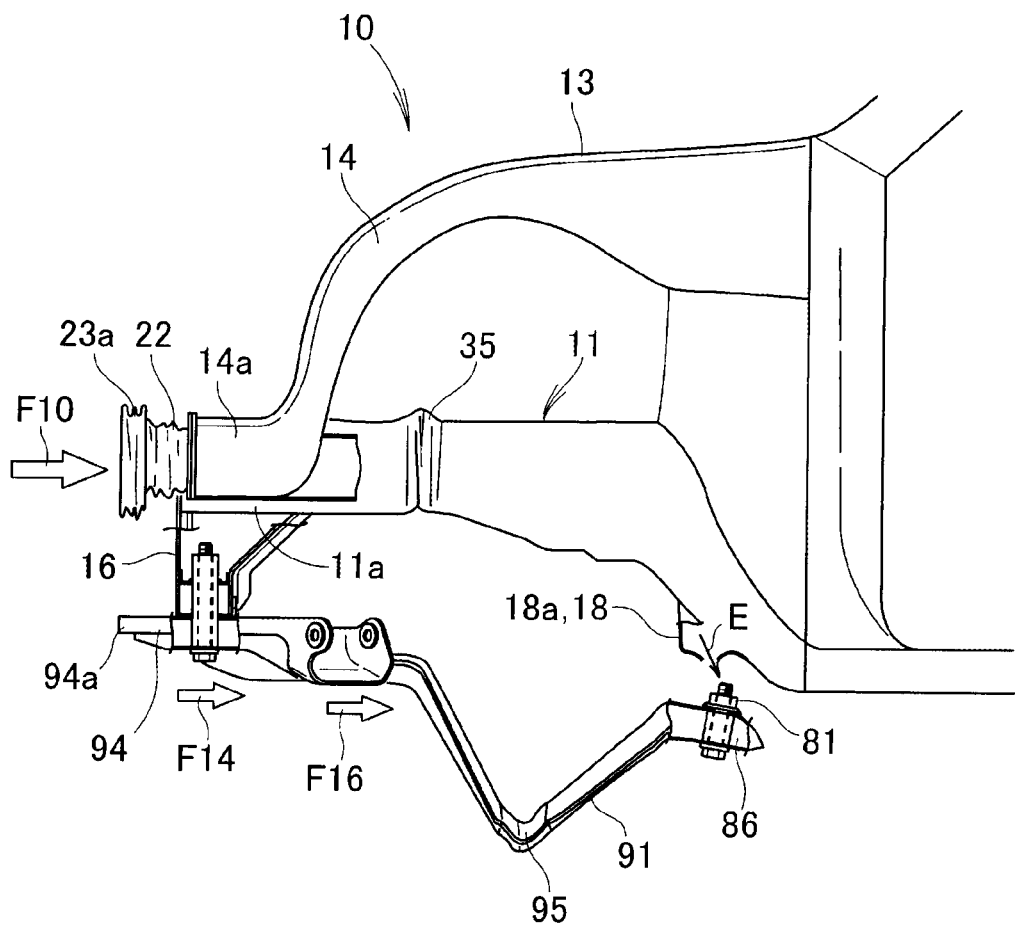
FIG. 15 illustrates an example case where the left front side frame in the vehicle front body structure according to one embodiment of the present disclosure further bends in the intermediate period of the frontal collision.

As shown in FIG. 15, during a terminal period of the frontal collision during which the second fragile portion 95 of the left frame portion 91 has been bent by the component force F16, the nut 81 separates downward as indicated by an arrow E from the inner end portion 18a of the left floor member 18. Therefore, the left rear mounting portion 86 of the left frame portion 91 separates downward from the inner end portion 18a of the left floor member 18.

Because the left frame portion 91 is to separate from the inner end portion 18a, there is no risk of the left frame portion 91 impeding the bending of the left front side frame 11. Therefore, the left front side frame 11 will be more suitably bent at the first fragile portion 35, so that impact energy can be more stably absorbed.

Next, an example case in which impact load F17 input to a left end portion of the vehicle front body structure 10 due to a narrow offset frontal collision is absorbed will be described with reference to FIGS. 16A and 16B.

Figure 16A:
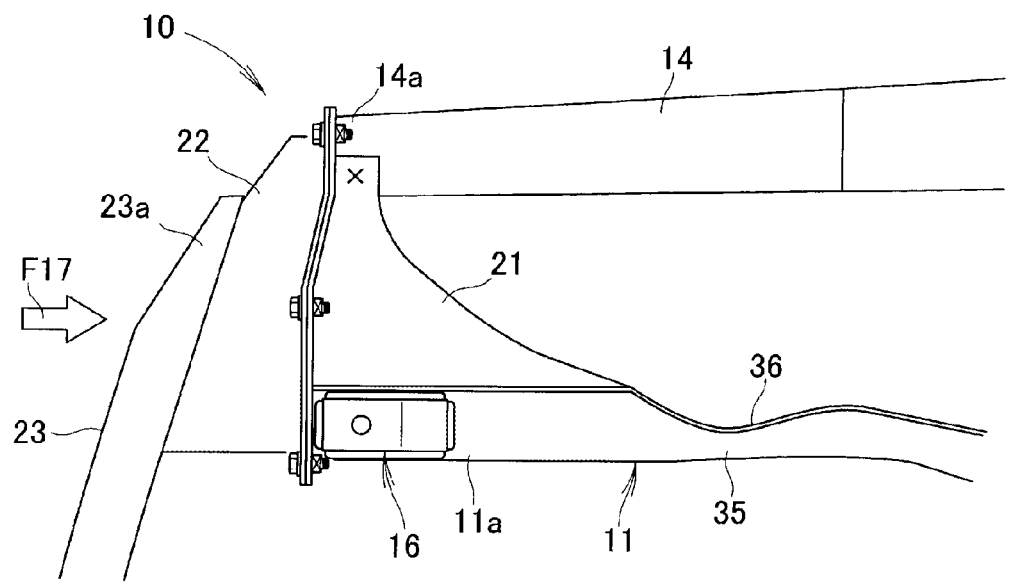
FIGS. 16A and 16B illustrate an example case where impact load of a narrow offset frontal collision is input to a left end portion of the vehicle front body structure according to one embodiment of the present disclosure.

As shown in FIG. 16A, when a narrow offset frontal collision occurs on a left end portion of the vehicle front body structure 10, impact load F17 is input to the bumper beam left end portion 23a. The impact load F17 input to the left end portion 23a is transmitted to the left bumper beam extension 22.

Figure 16B:
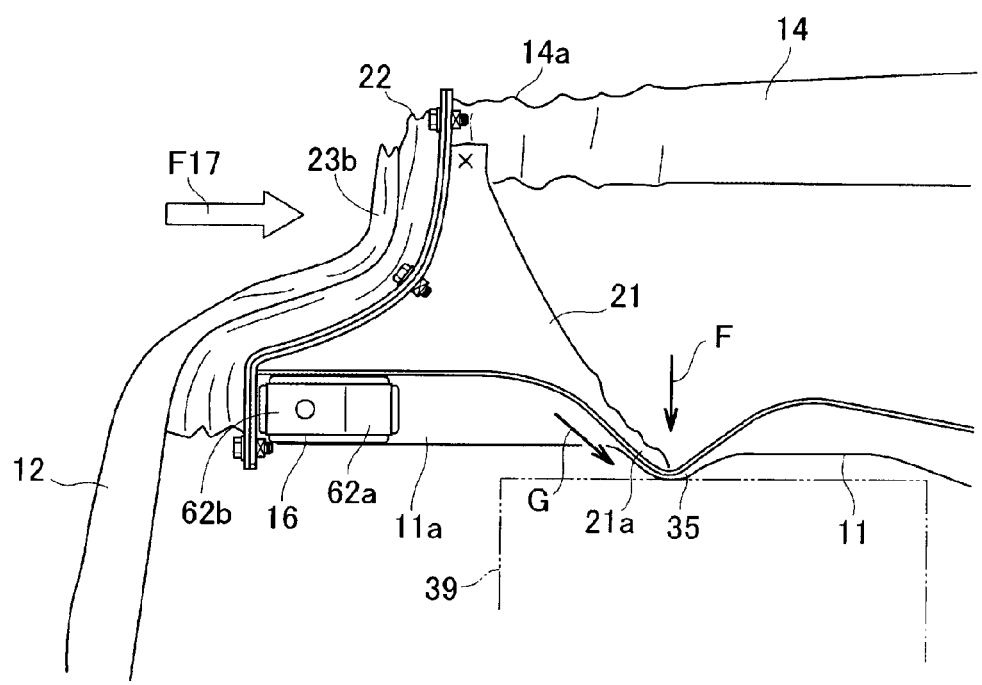

As shown in FIG. 16B, as the impact load F17 is input, the input impact load F17 crushes the bumper beam left end portion 23a and the left bumper beam extension 22. Furthermore, the front end portion 14a of the left lower member 14 is crushed.

Simultaneously, the first fragile portion 35 of the left front side frame 11 is bent inward in the vehicle width direction as indicated by an arrow F. The bent first fragile portion 35 is pressed against the motive power source 39 disposed inward in the vehicle width direction.

Further, the rear end portion 21a of the left reinforcement portion 21 is pushed out toward the first depression portion 36 of the first fragile portion 35 as indicated by an arrow G. Therefore, the first fragile portion 35 is pressed between the motive power source 39 and the rear end portion 21a of the left reinforcement portion 21.

Therefore, the first fragile portion 35 is suitably crushed in the vehicle width direction between the motive power source 39 and the rear end portion 21a of the left reinforcement portion 21, so that impact energy can be stably absorbed.

Note that the vehicle front body structure according to the present disclosure is not limited to the foregoing embodiment but can be changed or modified in suitable manners.

For example, although in the foregoing embodiment, the first depression portions 36 and the second depression portions 96 have substantially concavely hollowed inward in the vehicle width direction, this configuration is not restrictive. The first depression portions 36 and the second depression portions 96 may have other shapes, for example, a substantially V shape, a substantially U shape, etc.

Furthermore, although in the foregoing embodiment, the left rear mounting portion 86 of the subframe 25 is mounted on the inner end portion 18a of the left floor member 18, this configuration is not restrictive. The left rear mounting portion 86 of the subframe 25 may be mounted on a different site, for example, the rear end portion 11b of the left front side frame (vehicle body frame) 11 or the like.

In the case where the left rear mounting portion 86 of the subframe 25 is mounted on the rear end portion 11b of the left front side frame 11, the left frame portion 91 of the subframe 25 extends rearward substantially in the vehicle body front-rear direction along the left front side frame 11. In this case, impact energy can be suitably absorbed as in the foregoing embodiment.

Furthermore, the shapes and constructions adopted in the vehicle front body structure illustrated above in conjunction with the foregoing embodiment, that is, the shapes and constructions of the left and right front side frames, the left and right front pillars, the left and right upper members, the left and right lower members, the left and right subframe support portions, the left and right floor members, the left and right reinforcement portions, the left and right bumper beam extensions, the bumper beam, the subframe, the first fragile portion, the first depression portion, the left and right front wheels, the bulkhead, the collar nut, the supporting oblique surface, the left and right front mounting portions, the left and right rear mounting portions, the left frame portion, the bent portion, the extension portion, the second fragile portion, the second depression portion, the reinforcement oblique surface, etc., are not limited to the shapes and constructions illustrated above as examples but may be changed or modified as appropriate.

The present disclosure is suitably applicable to motor vehicles having a vehicle front body structure in which front side frames extend in the vehicle body front-rear direction and a subframe is provided below the front side frames. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle front body structure comprising:
   a front side frame extending in a vehicle body front-rear direction;
   a bumper beam extension provided to a front end portion of the front side frame;
   a bumper beam provided to the bumper beam extension and extending in a vehicle width direction; and
   a subframe provided below the front side frame,
   wherein the front side frame has a first fragile portion that is disposed in an intermediate portion of the front side frame in the vehicle body front-rear direction,
   wherein the subframe has a second fragile portion that is disposed in an intermediate portion of the subframe in the vehicle body front-rear direction, and has an extension portion that extends further forward substantially in the vehicle body front-rear direction than the front end portion of the front side frame, and
   a front edge portion of the extension portion is disposed so as to substantially coincide with a front surface of the bumper beam in the vehicle body front-rear direction when the bumper beam and the bumper beam extension are crushed by an impact load,
   wherein the vehicle front body structure further comprises a subframe support portion that connects a front end portion of the subframe to the front end portion of the front side frame from below and that has a supporting oblique surface that extends toward the first fragile portion.

2. The vehicle front body structure according to claim 1, wherein the first fragile portion has a depression portion that is recessed inward in the vehicle width direction so as to avoid interference with a road wheel provided on an outward side of the front side frame in the vehicle width direction when the road wheel is turned inward in the vehicle width direction.

3. The vehicle front body structure according to claim 1, wherein the subframe support portion includes:
   a bulkhead that is provided inside the subframe support portion and provided below the supporting oblique surface; and
   a collar nut which is provided inside the subframe support portion and whose seat portion is joined to a bottom surface of the subframe support portion and whose upper portion is joined to the bulkhead, and
   wherein a fastening member that extends through the subframe from below is coupled to the collar nut.

4. The vehicle front body structure according to claim 1, wherein:
   the subframe includes a bent portion bent downward, the second fragile portion being provided in the bent portion; and
   the second fragile portion has a depression portion that is recessed from an outside of the second fragile portion in the vehicle width direction toward an inside of the second fragile portion in the vehicle width direction.

5. The vehicle front body structure according to claim 1, wherein a rear end portion of the subframe is fastened to a vehicle body frame such that the rear end portion of the subframe is separable from the vehicle body frame when the subframe is bent by the impact load.

6. The vehicle front body structure according to claim 1, further comprising:
   a front pillar that is disposed and stands on an outward side of the front side frame in the vehicle width direction;
   an upper member that extends forward from a portion of the front pillar which is above the front side frame;
   a lower member that extends from a front end portion of the upper member to a location on the outward side of the front side frame in the vehicle width direction; and
   a reinforcement portion disposed between a front end portion of the lower member and the front end portion of the front side frame and connecting the front end portion of the lower member and the front end portion of the front side frame, wherein
   the reinforcement portion has in a plan view a triangular shape that is partially defined by a reinforcement oblique surface that extends obliquely from the front end portion of the lower member toward the first fragile portion.

7. The vehicle front body structure according to claim 6, wherein the bumper beam is connected, via the bumper beam extension, to a front portion of the front side frame, a front portion of the reinforcement portion, and a front portion of the lower member.

8. The vehicle front body structure according to claim 1, wherein the front edge portion of the extension portion is located between the front surface of the bumper beam and the front end portion of the front side frame before the bumper beam and the bumper beam extension are crushed by the impact load.

9. The vehicle front body structure according to claim 1, wherein the supporting oblique surface extends obliquely rearward and upward toward the first fragile portion.

10. The vehicle front body structure according to claim 6, wherein the reinforcement oblique surface extends obliquely rearward toward the first fragile portion.

11. The vehicle front body structure according to claim 1, wherein the first fragile portion of the front side frame is disposed on an outer side of a vehicle power plant in the vehicle width direction.

12. The vehicle front body structure according to claim 9 wherein the supporting oblique surface is connected to a front end of the first fragile portion.

* * * * *